United States Patent
Ye

(10) Patent No.: US 12,200,162 B2
(45) Date of Patent: Jan. 14, 2025

(54) SCREEN PROJECTION METHOD AND ELECTRONIC DEVICE

(71) Applicant: HUAWEI TECHNOLOGIES CO., LTD., Guangdong (CN)

(72) Inventor: Fei Ye, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 443 days.

(21) Appl. No.: 17/628,646

(22) PCT Filed: Jul. 23, 2020

(86) PCT No.: PCT/CN2020/103883
§ 371 (c)(1),
(2) Date: Jan. 20, 2022

(87) PCT Pub. No.: WO2021/018008
PCT Pub. Date: Feb. 4, 2021

(65) Prior Publication Data
US 2022/0279062 A1  Sep. 1, 2022

(30) Foreign Application Priority Data
Jul. 30, 2019 (CN) .................. 201910696603.2

(51) Int. Cl.
*H04M 1/72412* (2021.01)
*G01S 5/04* (2006.01)
*G06F 3/0488* (2022.01)

(52) U.S. Cl.
CPC .......... *H04M 1/72412* (2021.01); *G01S 5/04* (2013.01); *G06F 3/0488* (2013.01);
(Continued)

(58) Field of Classification Search
CPC ......... H04M 1/72412; H04M 2250/02; H04M 2250/64; G01S 5/04; G06F 3/0488; G06F 2203/04808
(Continued)

(56) References Cited

U.S. PATENT DOCUMENTS 9,582,903 B2 * 2/2017 Hirotani .............. G06F 3/04883
2010/0185501 A1   7/2010 Chou et al.
(Continued)

FOREIGN PATENT DOCUMENTS

CN  1535399 A    10/2004
CN  102650804 A   8/2012
(Continued)

OTHER PUBLICATIONS

Extended European Search Report dated Jul. 12, 2022 issued for European Application No. EP 20 847 320.7 (11 pages).
(Continued)

*Primary Examiner* — Mong-Thuy T Tran

(57) ABSTRACT

This application provides a screen projection method and an electronic device. The method includes: detecting a position of one or more other electronic devices relative to a first electronic device by using a Bluetooth angle of arrival (AOA) technology (S1601); determining a target device from the one or more other electronic devices based on the position of the one or more other electronic devices relative to the first electronic device (S1602); detecting a screen projection operation (S1603), and sending first information to the target device in response to the screen projection operation, so that the target device displays or plays the first information (S1604). In the method, the electronic device may automatically determine a target electronic device from
(Continued)

a plurality of electronic devices, and then project a screen on the target electronic device, to facilitate operations and improve user experience.

18 Claims, 19 Drawing Sheets

(52) U.S. Cl.
CPC ............. *G06F 2203/04808* (2013.01); *H04M 2250/02* (2013.01); *H04M 2250/64* (2013.01)

(58) Field of Classification Search
USPC ....................................................... 455/41.2
See application file for complete search history.

(56) References Cited

U.S. PATENT DOCUMENTS

| | | | |
|---|---|---|---|
| 2011/0081923 | A1 | 4/2011 | Forutanpour et al. |
| 2015/0326704 | A1 | 11/2015 | Ko et al. |
| 2016/0179295 | A1 | 6/2016 | Liang et al. |
| 2016/0283020 | A1* | 9/2016 | Heo ........................ G06F 3/0416 |
| 2017/0013112 | A1* | 1/2017 | Singhar ................. H04W 4/025 |
| 2017/0332149 | A1 | 11/2017 | Veeramani et al. |
| 2017/0351531 | A1* | 12/2017 | Li ........................... G06F 3/1454 |
| 2018/0196596 | A1* | 7/2018 | Choi ....................... H04W 4/80 |
| 2018/0246634 | A1* | 8/2018 | Suh ....................... G06F 3/1423 |
| 2018/0293523 | A1* | 10/2018 | Bergdale ................ G06Q 50/40 |
| 2019/0132436 | A1* | 5/2019 | Jang ...................... G06F 16/951 |
| 2019/0163337 | A1* | 5/2019 | Gill ......................... G06F 9/451 |

FOREIGN PATENT DOCUMENTS

| | | | |
|---|---|---|---|
| CN | 102945131 | A | 2/2013 |
| CN | 103036962 | A | 4/2013 |
| CN | 103826007 | A | 5/2014 |
| CN | 105319532 | A | 2/2016 |
| CN | 105828139 | A | 8/2016 |
| CN | 106817396 | A | 6/2017 |
| CN | 108040270 | A * | 5/2018 |
| CN | 108430034 | A | 8/2018 |
| CN | 108762701 | A | 11/2018 |
| CN | 109699004 | A | 4/2019 |
| CN | 110597473 | A | 12/2019 |
| KR | 20160146343 | A | 12/2016 |
| KR | 20180037923 | A | 4/2018 |
| WO | 2017173793 | A1 | 10/2017 |

OTHER PUBLICATIONS

Office Action issued in CN201910696603.2, dated Dec. 17, 2020, 8 pages.
Office Action issued in CN201910696603.2, dated Apr. 16, 2020, 8 pages.
International Search Report and Written Opinion issued in PCT/CN2020/103883, dated Oct. 27, 2020, 12 pages.

* cited by examiner

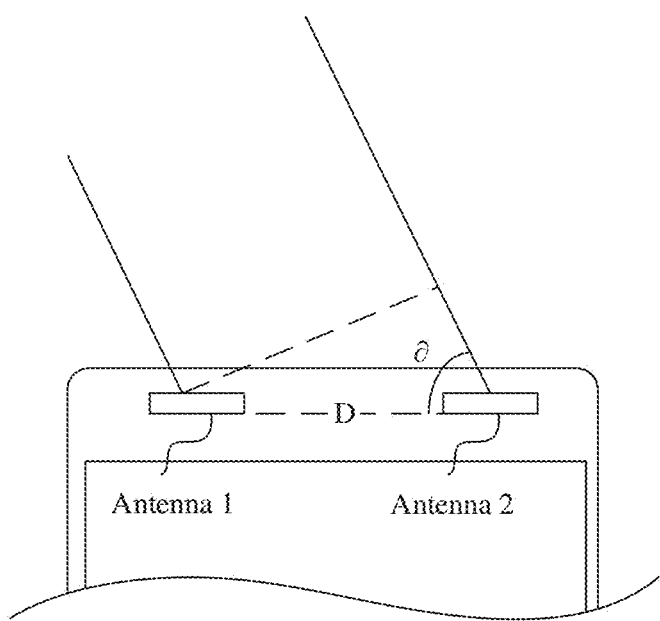
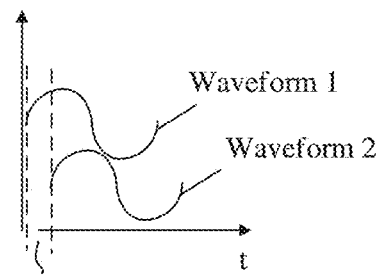
FIG. 8(a)                    FIG. 8(b)

SCREEN PROJECTION METHOD AND ELECTRONIC DEVICE

CROSS-REFERENCE TO RELATED APPLICATIONS

This application is a National Stage of International Patent Application No. PCT/CN2020/103883 filed on Jul. 23, 2020, which claims priority to Chinese Patent Application No. 201910696603.2, filed on Jul. 30, 2019. Both of the aforementioned applications are hereby incorporated by reference in their entireties.

TECHNICAL FIELD

This disclosure relates to the field of terminal technologies, and in particular, to a screen projection method and an electronic device.

BACKGROUND

With advancement of terminal technologies, electronic devices gradually become necessities in people's daily life. A user may obtain and communicate information by using the electronic devices. Generally, there may be a plurality of manners for exchanging information between two electronic devices, for example, information is transmitted by using a three-party application (such as WeChat or messages), or information is transmitted by using a screen projection technology.

A mobile phone is used as an example. A current screen projection process includes the following: After enabling a screen projection function, the mobile phone displays a list, and the list includes a device identifier of one or more found electronic devices. For example, referring to FIG. 1, a display of the mobile phone displays a list, and the list includes identifiers of a plurality of electronic devices. When detecting an operation used to select a first identifier in the list, the mobile phone projects a screen on an electronic device corresponding to the first identifier.

It can be learned that the user needs to perform complex operations in the current screen projection process. Particularly, when the list includes a large quantity of target electronic devices, the user needs to manually determine a target electronic device from the list. Device identifiers of the target electronic devices are usually displayed in the list, and the device identifier is a series of characters/letters and cannot be easily understood. As a result, it may be difficult for the user to select the target electronic device from the list by using the device identifier.

SUMMARY

An example objective of this disclosure is to provide a screen projection method and an electronic device. In the method, the electronic device may automatically determine a target electronic device from a plurality of electronic devices, and then project a screen on the target electronic device, to facilitate operations and improve user experience.

The foregoing example objectives and another example objective may be achieved by using features in independent claims. Further implementations are reflected in the dependent claims, the specification, and the accompanying drawings.

According to a first aspect, this disclosure provides a screen projection method, applied to a first electronic device, where the first electronic device enables a Bluetooth function, and the method includes: detecting a position of one or more other electronic devices relative to the first electronic device by using a Bluetooth angle of arrival (AOA) technology; determining a target device from the one or more other electronic devices based on the position of the one or more other electronic devices relative to the first electronic device; detecting a screen projection operation; and sending first information to the target device in response to the screen projection operation, so that the target device displays or plays the first information.

In this disclosure, the first electronic device may automatically determine a target electronic device from a plurality of electronic devices by using the Bluetooth AOA technology, and then project a screen on the target electronic device, to facilitate operations and improve user experience.

In a possible implementation, before the sending first information to the target device in response to the screen projection operation, the method further includes: obtaining a capability of the target device; and sending, to the target device based on the capability of the target device, first information that matches the capability.

In this disclosure, the first electronic device sends, to the target device, the first information that matches the capability of the target device, to prevent the target device from being incapable of displaying or playing information sent to the target device. This helps improve information sending accuracy.

In a possible implementation, the sending, to the target device based on the capability of the target device, first information that matches the capability includes: if the target device has no screen display function but has an audio playback function, sending first information of the first electronic device to the target device, where the first information is audio information currently played by the first electronic device; or if the target device has a screen display function but has no audio playback function, sending first information of the first electronic device to the target device, where the first information is display information currently displayed by the first electronic device; or if the target device has a screen display function and an audio playback function, sending first information of the first electronic device to the target device, where the first information includes audio information currently played by the first electronic device and display information currently displayed by the first electronic device.

In this disclosure, the first electronic device sends, to the target device, the first information that matches the capability of the target device, to prevent the target device from being incapable of displaying or playing information sent to the target device. This helps improve information sending accuracy. For example, if the target device has no screen display function but has the audio playback function, the first electronic device sends the currently played audio information to the target device; or if the target device has the screen display function but has no audio playback function, the first electronic device sends the currently displayed display information to the target device; or if the target device has the screen display function and the audio playback function, the first electronic device sends the currently played audio information and the currently displayed display information to the target device.

In a possible implementation, the obtaining a capability of the target device includes: determining the capability of the target device based on a device type of the target device; or sending query information to the target device, where the query information is used to query whether the target device has the screen display function and/or whether the target device has the audio playback function; and receiving feedback information sent by the target device, and determining the capability of the target device based on the feedback information.

In this disclosure, the first electronic device may obtain the capability of the target device in a plurality of manners, for example, identifying the capability of the target device by using the device type of the target device, or sending the query information to the target device to determine the capability of the target device through query. The first electronic device sends, to the target device, the first information that matches the capability of the target device, to prevent the target device from being incapable of displaying or playing information sent to the target device. This helps improve information sending accuracy.

In a possible implementation, that the query information is used to query whether the target device has the screen display function includes: the query information is used to query whether the target device has a display and whether the display is lit up; and that the query information is used to query whether the target device has the audio playback function includes: the query information is used to query whether the target device has an audio playback module and whether the audio playback module is enabled.

In this disclosure, the query information sent by the first electronic device to the target device may be used to query whether the target device has a display and whether the display is lit up, and/or query whether the target device has an audio playback module (for example, a loudspeaker) and whether the audio playback module is enabled. The first electronic device may send, to the target device, the first information that matches the capability of the target device, to prevent the target device from being incapable of displaying or playing information sent to the target device. This helps improve information sending accuracy.

In a possible implementation, the screen projection operation includes: an operation that three fingers slide simultaneously on a display; or an operation that at least two fingers touch and hold a display simultaneously and slide upward without an interval after the touching and holding; or an operation that at least one knuckle double taps a display simultaneously; or an operation that at least one knuckle touches and holds a display simultaneously and slides upward without an interval after the touching and holding; or an operation that a palm is in contact with a display and slides upward on the display; or an operation that a palm slides above a display when the palm is suspended over the display and is not in contact with the display.

It should be understood that the foregoing screen projection operations are merely examples and set no limitation.

In a possible implementation, after the detecting a position of one or more other electronic devices relative to the first electronic device by using a Bluetooth angle of arrival (AOA) technology, the method further includes: displaying a first interface, where the first interface includes a first device identifier of the first electronic device and another device identifier of each of the one or more other electronic devices, the other device identifiers are distributed around the first device identifier based on the position relative to the first electronic device, the first device identifier includes a first direction arrow, and a pointing direction of the first direction arrow changes with movement of the first electronic device; and after the determining a target device from the one or more other electronic devices based on the position of the one or more other electronic devices relative to the first electronic device, the method further includes: displaying the first direction arrow in the first interface, so that the first direction arrow points to a device identifier of the target device.

In this disclosure, after determining the position of the one or more other electronic devices around the first electronic device relative to the first electronic device by using the Bluetooth AOA technology, the first electronic device may display the first interface. Layout between the device identifier of each of the other electronic devices and a local device identifier of the first electronic device in the first interface may reflect layout between electronic devices in a real environment. In this disclosure, a user is assisted intuitively in determining a target device on which the screen is to be projected. For example, when the first direction arrow on the local device identifier of the first electronic device in the first interface points to a device identifier, it indicates that the first electronic device is aligned with an electronic device corresponding to the device identifier, namely, the target device, and the first electronic device may project the screen on the target device, to facilitate user operations and improve user experience.

In a possible implementation, before the detecting a position of one or more other electronic devices relative to the first electronic device by using a Bluetooth angle of arrival (AOA) technology, the method further includes: displaying a second interface; and after the detecting a position of one or more other electronic devices relative to the first electronic device by using a Bluetooth angle of arrival (AOA) technology, the method further includes: displaying a first window in the second interface, where the first window includes a third interface, and the third interface is an interface obtained by scaling down the first interface.

In this disclosure, the first electronic device displays an interface, and the interface may include the first window. Position distribution of the one or more other electronic devices around the first electronic device relative to the first electronic device is displayed in the first window. The user may intuitively learn of distribution of the one or more other electronic devices around the local device (namely, the first electronic device) by using the first window, so that the user conveniently aligns the first electronic device with an electronic device around the first electronic device, to implement a process of projecting the screen on the electronic device, and facilitate user operations.

In a possible implementation, before the sending first information to the target device in response to the screen projection operation, the method further includes: outputting prompt information, where the prompt information is used to prompt a user whether to connect to the target device; and after receiving an instruction of determining to connect to the target device, establishing a connection to the target device; or the sending first information to the target device in response to the screen projection operation includes: in response to the screen projection operation, establishing a connection to the target device, and sending the first information to the target device.

In this disclosure, after determining the target device, the first electronic device may directly establish a connection to the target device, or may output the prompt information to prompt the user whether to connect to the target device. After receiving an acknowledgement, the first electronic device connects to the target device, and then projects the screen on the target electronic device. In the screen projection method provided in this disclosure, the user does not need to manually select the target device from a device list (for example, a list shown in FIG. 1), to facilitate operations and help improve user experience.

In a possible implementation, the determining a target device from the one or more other electronic devices based on the position of the one or more other electronic devices relative to the first electronic device includes: determining a target device that is in the one or more other electronic devices and that is in a preset position range; or determining a target device that is in the one or more other electronic devices and that is directly in front of the first electronic device.

In this disclosure, the first electronic device may determine the target device that is in the one or more other electronic devices around the first electronic device and that is in the preset position range, or the target device that is in the one or more other electronic devices around the first electronic device and that is directly in front of the first electronic device. In the screen projection method provided in this disclosure, the user does not need to manually select the target device from a device list (for example, a list shown in FIG. 1), to facilitate operations and help improve user experience.

According to a second aspect, this disclosure further provides an electronic device, including an input device, at least one processor, and a communications module. The at least one processor is configured to detect a position of one or more other electronic devices relative to the electronic device by using a Bluetooth angle of arrival (AOA) technology. The at least one processor is further configured to determine a target device from the one or more other electronic devices based on the position of the one or more other electronic devices relative to the first electronic device. The input device is configured to detect a screen projection operation. The at least one processor is further configured to send, in response to the screen projection operation, first information to the target device by using the communications module, so that the target device displays or plays the first information.

In a possible implementation, the at least one processor is further configured to: obtain a capability of the target device; and determine, based on the capability of the target device, first information that matches the capability.

In a possible implementation, the at least one processor is specifically configured to: if the target device has no screen display function but has an audio playback function, determine that audio information currently played by the first electronic device is the first information; or if the target device has a screen display function but has no audio playback function, determine that display information currently displayed by the first electronic device is the first information; or if the target device has a screen display function and an audio playback function, determine that audio information currently played by the first electronic device and display information currently displayed by the first electronic device is the first information.

In a possible implementation, when obtaining the capability of the target device, the at least one processor is specifically configured to: determine the capability of the target device based on a device type of the target device; or send query information to the target device by using the communications module, where the query information is used to query whether the target device has the screen display function and/or whether the target device has the audio playback function; and receive, by using the communications module, feedback information sent by the target device, and determine the capability of the target device based on the feedback information.

In a possible implementation, that the query information is used to query whether the target device has the screen display function includes: the query information is used to query whether the target device has a display and whether the display is lit up; and that the query information is used to query whether the target device has the audio playback function includes: the query information is used to query whether the target device has an audio playback module and whether the audio playback module is enabled.

In a possible implementation, the screen projection operation includes: an operation that three fingers slide simultaneously on a display; or an operation that at least two fingers touch and hold a display simultaneously and slide upward without an interval after the touching and holding; or an operation that at least one knuckle double taps a display simultaneously; or an operation that at least one knuckle touches and holds a display simultaneously and slides upward without an interval after the touching and holding; or an operation that a palm is in contact with a display and slides upward on the display; or an operation that a palm slides above a display when the palm is suspended over the display and is not in contact with the display.

In a possible implementation, the electronic device further includes a display; the display is configured to display a first interface after the at least one processor detects the position of the one or more other electronic devices relative to the first electronic device by using the Bluetooth angle of arrival (AOA) technology, where the first interface includes a first device identifier of the first electronic device and another device identifier of each of the one or more other electronic devices, the other device identifiers are distributed around the first device identifier based on the position relative to the first electronic device, the first device identifier includes a first direction arrow, and a pointing direction of the first direction arrow changes with movement of the first electronic device; and the display is further configured to: after the at least one processor determines the target device from the one or more other electronic devices based on the position of the one or more other electronic devices relative to the first electronic device, display the first direction arrow in the first interface, so that the first direction arrow points to a device identifier of the target device.

In a possible implementation, the display is further configured to display a second interface before the at least one processor detects the position of the one or more other electronic devices relative to the first electronic device by using the Bluetooth angle of arrival (AOA) technology; and the display is further configured to display a first window in the second interface after the at least one processor is configured to detect the position of the one or more other electronic devices relative to the first electronic device by using the Bluetooth angle of arrival (AOA) technology, where the first window includes a third interface, and the third interface is an interface obtained by scaling down the first interface.

In a possible implementation, before sending, in response to the screen projection operation, the first information to the target device by using the communications module, the at least one processor is further configured to output prompt information by using the display of the electronic device, where the prompt information is used to prompt a user whether to connect to the target device, and the at least one processor is further configured to: after the electronic device receives an instruction of determining to connect to the target device, establish a connection to the target device by using the communications module; or when sending, in response to the screen projection operation, the first information to the target device by using the communications module, the at least one processor is specifically configured to: in response to the screen projection operation, establish a connection to the target device by using the communications module, and send the first information to the target device by using the communications module.

In a possible implementation, when determining the target device from the one or more other electronic devices based on the position of the one or more other electronic devices relative to the first electronic device, the at least one processor is specifically configured to: determine a target device that is in the one or more other electronic devices and that is in a preset position range; or determine a target device that is in the one or more other electronic devices and that is directly in front of the first electronic device.

According to a third aspect, an embodiment of this disclosure further provides an electronic device. The electronic device includes at least one processor and a memory. The memory is configured to store one or more computer programs. When the one or more computer programs stored in the memory are executed by the at least one processor, the electronic device can implement the technical solution in any one of the first aspect or the possible implementations of the first aspect.

According to a fourth aspect, an embodiment of this disclosure further provides an electronic device. The electronic device includes modules/units that perform the method according to any one of the first aspect and the possible implementations of the first aspect. These modules/units may be implemented by hardware, or may be implemented by hardware by executing corresponding software.

According to a fifth aspect, an embodiment of this disclosure further provides a chip. The chip is coupled to a memory in an electronic device, and is configured to invoke a computer program stored in the memory and execute the technical solution in any one of the first aspect of the embodiments of this disclosure or the possible implementations of the first aspect. In this embodiment of this disclosure, "coupling" means that two components are directly or indirectly combined with each other.

According to a sixth aspect, an embodiment of this disclosure further provides a computer-readable storage medium. The computer-readable storage medium includes a computer program. When the computer program is run on an electronic device, the electronic device is enabled to perform the technical solution in any one of the first aspect of the embodiments of this disclosure or the possible implementations of the first aspect.

According to a seventh aspect, an embodiment of this disclosure provides a program product, including instructions. When the program product runs on an electronic device, the electronic device is enabled to perform the technical solution in any one of the first aspect of the embodiments of this disclosure or the possible implementations of the first aspect.

BRIEF DESCRIPTION OF DRAWINGS

FIG. 8($a$) and FIG. 8($b$) are a schematic diagram of determining, by a mobile phone 100, a position of a device relative to the mobile phone 100 according to an embodiment of this disclosure;

DESCRIPTION OF EMBODIMENTS

Figure 1:
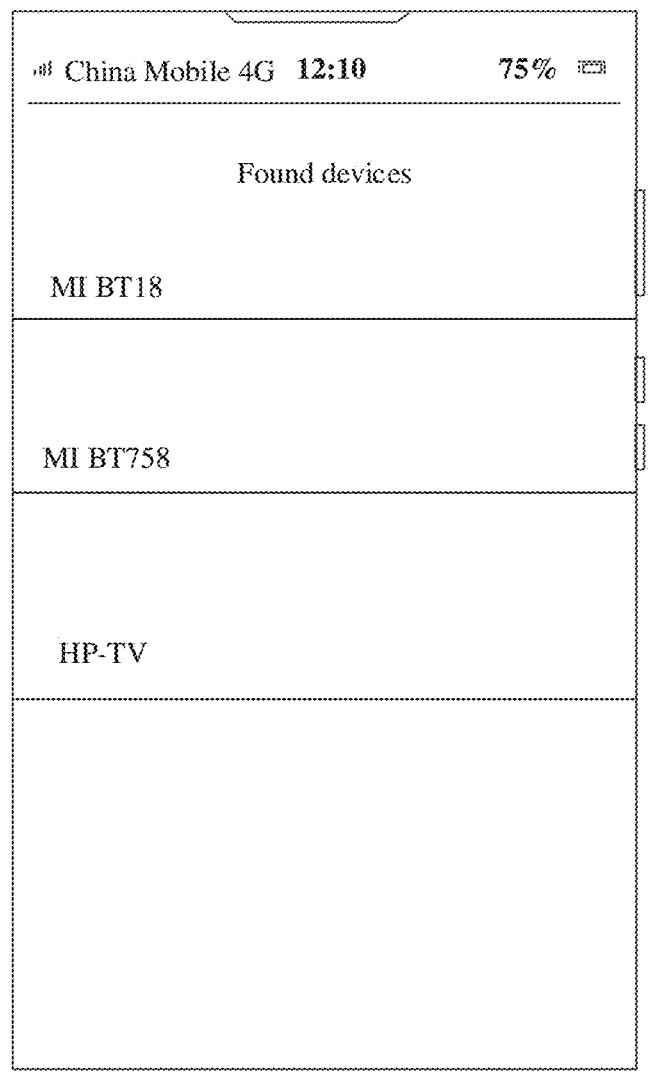
FIG. 1 is a schematic diagram of a graphical user interface in a conventional technology.

The following clearly and completely describes the technical solutions in embodiments of this disclosure with reference to the accompanying drawings in the embodiments of this disclosure.

Terms used in the following embodiments are merely intended to describe specific embodiments, but are not intended to limit this disclosure. The terms "one", "a", "the", "the foregoing", "this", and "the one" of singular forms used in this specification and the appended claims of this disclosure are also intended to include forms such as "one or more", unless otherwise specified in the context clearly. It should be further understood that, in the embodiments of this disclosure, "one or more" means one, two, or more. In addition, "and/or" describes an association relationship between associated objects, and indicates that three relationships may exist. For example, A and/or B may indicate the following cases: Only A exists, both A and B exist, and only B exists, where A and B may be singular or plural. The character "/" usually represents an "or" relationship between the associated objects.

Reference to "an embodiment", "some embodiments", or the like described in this specification indicates that one or more embodiments of this disclosure include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referencing a same embodiment, instead, they mean "one or more but not all of the embodiments", unless otherwise specifically emphasized in other ways. The terms "include", "comprise", "have", and variants of the terms all mean "include but are not limited to", unless otherwise specifically emphasized in other ways.

The following describes some terms in the embodiments of this disclosure, to facilitate understanding of a person skilled in the art.

"A plurality of" mentioned in the embodiments of this disclosure means two or more. It should be noted that in the descriptions of the embodiments of this disclosure, terms such as "first" and "second" are merely intended for distinction in description, but should not be construed as indicating or implying relative importance or indicating or implying a sequence.

This disclosure may relate to two or more electronic devices. Two electronic devices are used as an example, and may be referred to as a first electronic device and a second electronic device. In some embodiments, the first electronic device may be a device having a small screen, for example, a mobile phone or an iPad, and the second electronic device may be a device having a large screen, for example, a notebook computer or a television. After a connection (a wired connection or a wireless connection) is established between the first electronic device and the second electronic device, the first electronic device may send information such as audio/a video/a picture to the second electronic device (by using a same-source screen projection technology or a different-source screen projection technology), so that the second electronic device plays/displays the information, and the like. FIG. 2 is a schematic diagram of a possible disclosure scenario according to an embodiment of this disclosure. In this scenario, an example in which the first electronic device is a mobile phone is used, and an example in which the second electronic device is a desktop computer is used. The mobile phone is connected to the desktop computer, and the mobile phone may display display content by using a screen of the desktop computer. For example, referring to FIG. 1, the mobile phone may send a display interface of an iQIYI application to the desktop computer, and the desktop computer displays the display interface of the iQIYI application, so that a user can view an effect of display content of the mobile phone on a large screen. This improves visual experience of the user. Certainly, in some other embodiments, the first electronic device may be a terminal device such as a mobile phone or a tablet computer, and the second electronic device may be an audio playback device such as a sound box. The first electronic device sends an audio file to the second electronic device such as a sound box for play. In another embodiment, the first electronic device and the second electronic device may be the same, for example, both are mobile phones. In this case, a file is transmitted between the mobile phones.

For the same-source screen projection technology in this embodiment of this disclosure, an example in which the first electronic device projects a screen on the second electronic device is used. Same-source screen projection means that the first electronic device and the second electronic device synchronously display projection content, namely, the second electronic device displays same content as the first electronic device. For example, in FIG. 2, after the mobile phone projects the display interface of iQIYI on the desktop computer, the mobile phone and the desktop computer synchronously display the display interface of iQIYI. Assuming that the mobile phone exits the iQIYI application and displays a home screen of the mobile phone, the desktop computer also displays the home screen of the mobile phone.

For the different-source screen projection technology in this embodiment of this disclosure, an example in which the first electronic device projects a screen on the second electronic device is used. Different-source screen projection means that the first electronic device and the second electronic device may not synchronously display projection content, namely, display content of the first electronic device and the second electronic device may be different. For example, in FIG. 2, after the mobile phone projects the display interface of iQIYI on the desktop computer, the mobile phone may switch running of iQIYI to background, and the mobile phone displays a home screen or a display interface of another application in foreground. When the mobile phone displays the home screen or the display interface of the another application, the desktop computer may still display the display interface of iQIYI, namely, the mobile phone and the desktop computer do not synchronously display projection content. The different-source screen projection technology may be used by the mobile phone to project a first interface of a first application on a screen of another electronic device, and the mobile phone displays a second interface of a second application, to facilitate user operations.

The electronic device (for example, the first electronic device or the second electronic device) in this embodiment of this disclosure may be a terminal having a communication function (for example, a Bluetooth communication function or a Wi-Fi communication function), for example, a mobile phone, a tablet computer, a television, a desktop computer, or a sound box. An example embodiment of the electronic device includes but is not limited to a terminal using iOS®, Android®, Microsoft®, or another operating system.

An application (app) program in the embodiments of this disclosure may be referred to as an application for short, and is a software program that can implement one or more specific functions. Generally, the electronic device may support a plurality of applications, for example, one or more of the following applications: a camera application, an instant messaging application, and a media playing application. There may be a plurality of instant messaging applications, for example, WeChat, Tencent Chat software (QQ), WhatsApp Messenger, Line, KakaoTalk, and DingTalk. There may be a plurality of media playback applications, for example, a music playback application such as KuGou and a video playback application such as iQIYI. The electronic device may send information such as a text, a voice, a picture, a video file, and various other files to another contact by using the instant messaging application. Alternatively, the electronic device may implement a voice call, a video call, and the like with another contact by using the instant messaging application. The electronic device may be further used to listen to or view an audio/video file by using the media playback application. An application in the following descriptions may be an application installed on the electronic device at delivery, may be an application downloaded by the electronic device from a network side and installed on the electronic device, or may be an application received by the electronic device from another electronic device. This is not limited in this embodiment of this disclosure.

Figure 3:
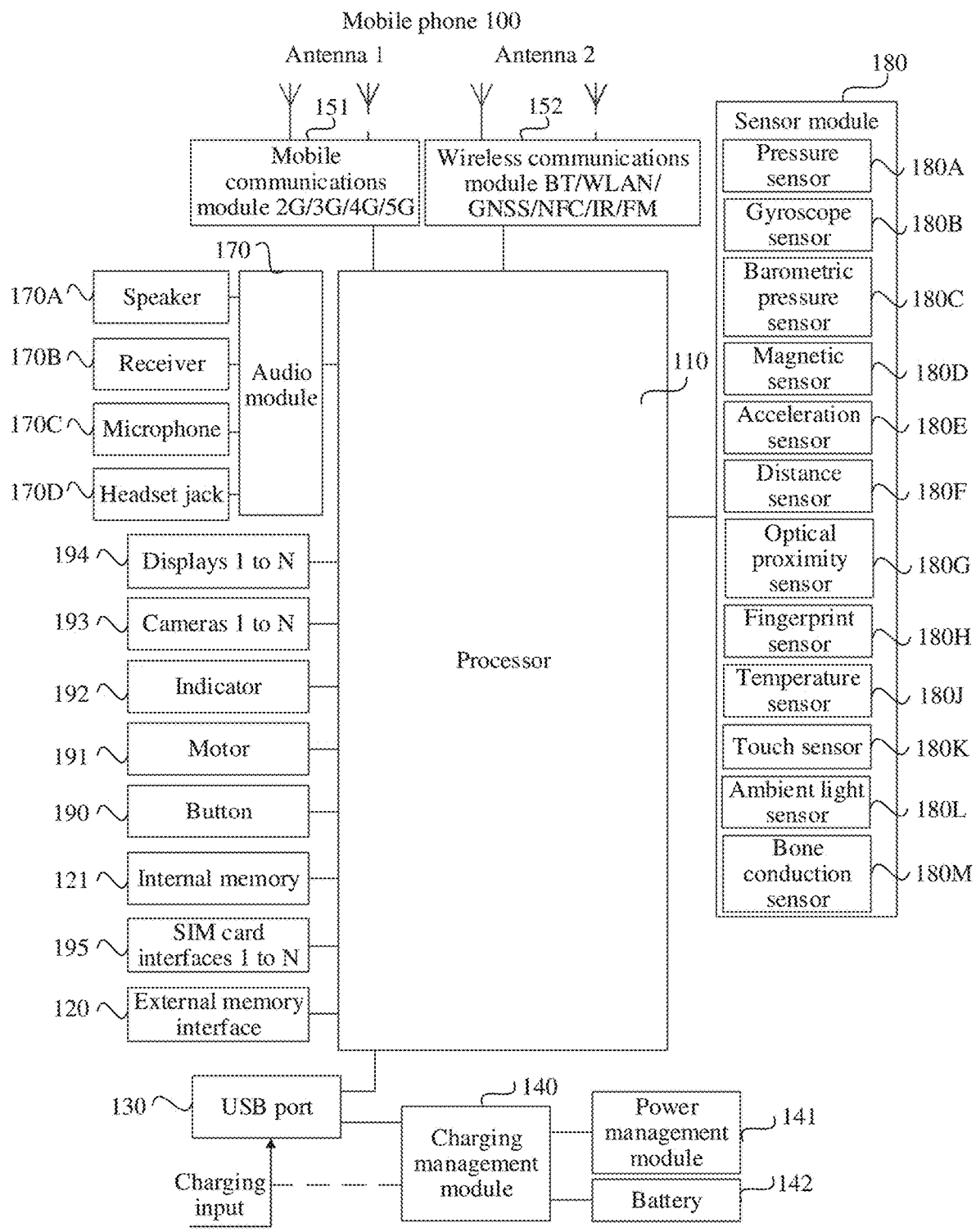
FIG. 3 is a schematic diagram of a hardware structure of a mobile phone 100 according to an embodiment of this disclosure.

An example in which the first electronic device is a mobile phone is used to describe a structure of the mobile phone in the following embodiment. FIG. 3 is a schematic diagram of a structure of a mobile phone 100. As shown in the FIG. 3, the mobile phone 100 may include a processor 110, an external memory interface 120, an internal memory 121, a universal serial bus (USB) port 130, a charging management module 140, a power management module 141, a battery 142, an antenna 1, an antenna 2, a mobile communications module 151, a wireless communications module 152, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

The processor 110 may include one or more processing units. For example, the processor 110 may include an application processor (AP), a modem processor, a graphics processing unit (, GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the mobile phone 100. The controller may generate an operation control signal based on instruction operation code and a time sequence signal, to complete control of instruction reading and instruction execution. A memory may be further disposed in the processor 110, and is configured to store an instruction and data. In some embodiments, the memory in the processor 110 is a cache. The memory may store an instruction or data that has been used or is cyclically used by the processor 110. If the processor 110 needs to use the instruction or the data again, the processor may directly invoke the instruction or the data from the memory. This avoids repeated access and reduces a waiting time of the processor 110, thereby improving system efficiency.

The display 194 is configured to display a display interface of an application on the mobile phone 100, for example, a framing interface of a camera or a chat interface of WeChat, and may further display an image, a video, and the like in a gallery. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. In some embodiments, the mobile phone 100 may include one or N displays 194, where N is a positive integer greater than 1.

The camera 193 is configured to capture a static image, a moving image, or a video. In some embodiments, the mobile phone 100 may have at least two cameras 193. An example in which there are two cameras 193 is used. One camera 193 is a front-facing camera, and the other camera 193 is a rear-facing camera. The camera 193 may include a photosensitive element, for example, a lens group and an image sensor. The lens group includes a plurality of lenses (convex lenses or concave lenses), and is configured to collect an optical signal reflected by a to-be-photographed object (for example, a face, or a landscape), and transfer the collected optical signal to the image sensor. The image sensor generates the image of the to-be-photographed object based on the optical signal.

The internal memory 121 may be configured to store computer-executable program code. The executable program code includes instructions. The processor 110 runs the instruction stored in the internal memory 121, to implement various function applications and data processing of the mobile phone 100. The internal memory 121 may include a program storage area and a data storage area. The program storage area may store an operating system, an application program (for example, a camera, a gallery, or WeChat) required by at least one function, and the like. The data storage area may store data (for example, a photo and a video) created during use of the mobile phone 100, and the like. In addition, the internal memory 121 may include a high-speed random access memory, and may further include a nonvolatile memory, for example, at least one magnetic disk storage device, a flash memory, and a universal flash storage (UFS).

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The distance sensor 180F is configured to measure a distance. The mobile phone 100 may measure a distance through infrared light or a laser. In some embodiments, in a photographing scenario, the mobile phone 100 may measure a distance by using the distance sensor 180F, to implement fast focusing. In some other embodiments, the mobile phone 100 may further detect, by using the distance sensor 180F, whether a person or an object approaches.

The optical proximity sensor 180G may include, for example, a light-emitting diode (LED) and an optical detector such as a photodiode. The light-emitting diode may be an infrared light-emitting diode. The mobile phone 100 emits infrared light through the light-emitting diode. The mobile phone 100 detects infrared reflected light from a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear to make a call, so as to automatically turn off a screen for power saving. The optical proximity sensor 180G may also be used in a leather case mode or a pocket mode to automatically unlock or lock the screen.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the mobile phone 100 is in a pocket to prevent an accidental touch. The fingerprint sensor 180H is configured to collect a fingerprint. The mobile phone 100 may use a feature of the collected fingerprint to implement fingerprint unlocking, application access locking, fingerprint photographing, fingerprint call answering, and the like. The temperature sensor 180J is configured to detect a temperature. In some embodiments, the mobile phone 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K.

The touch sensor may transfer the detected touch operation to the application processor, to determine a type of a touch event. Visual output related to the touch operation may be provided on the display 194. In some other embodiments, the touch sensor 180K may alternatively be disposed on a surface of the mobile phone 100 and is at a location different from a location of the display 194.

In addition, the mobile phone 100 may implement an audio function, for example, music playing and recording, by using the audio module 170, the speaker 170A, the receiver 170B, the microphone 170C, the headset jack 170D, the application processor, and the like. The mobile phone 100 may receive an input of the button 190, and generate a button signal input related to a user setting and function control of the mobile phone 100. The mobile phone 100 may generate a vibration prompt (for example, an incoming call vibration prompt) by using the motor 191. The indicator 192 in the mobile phone 100 may be an indicator light, may be configured to indicate a charging status and a power change, and may also be configured to indicate a message, a missed call, a notification, and the like. The SIM card interface 195 in the mobile phone 100 is configured to connect to a SIM card. The SIM card may be inserted into the SIM card interface 195 or plugged from the SIM card interface 195, to implement contact with or separation from the mobile phone 100.

It may be understood that an illustrated structure in the embodiments of the present invention does not constitute a specific limitation on the mobile phone 100. In some other embodiments of this disclosure, the mobile phone 100 may include more or fewer components than those shown in the figure, or combine some components, or divide some components, or have different component arrangements. The components shown in the figure may be implemented by using hardware, software, or a combination of software and hardware.

Figure 4:
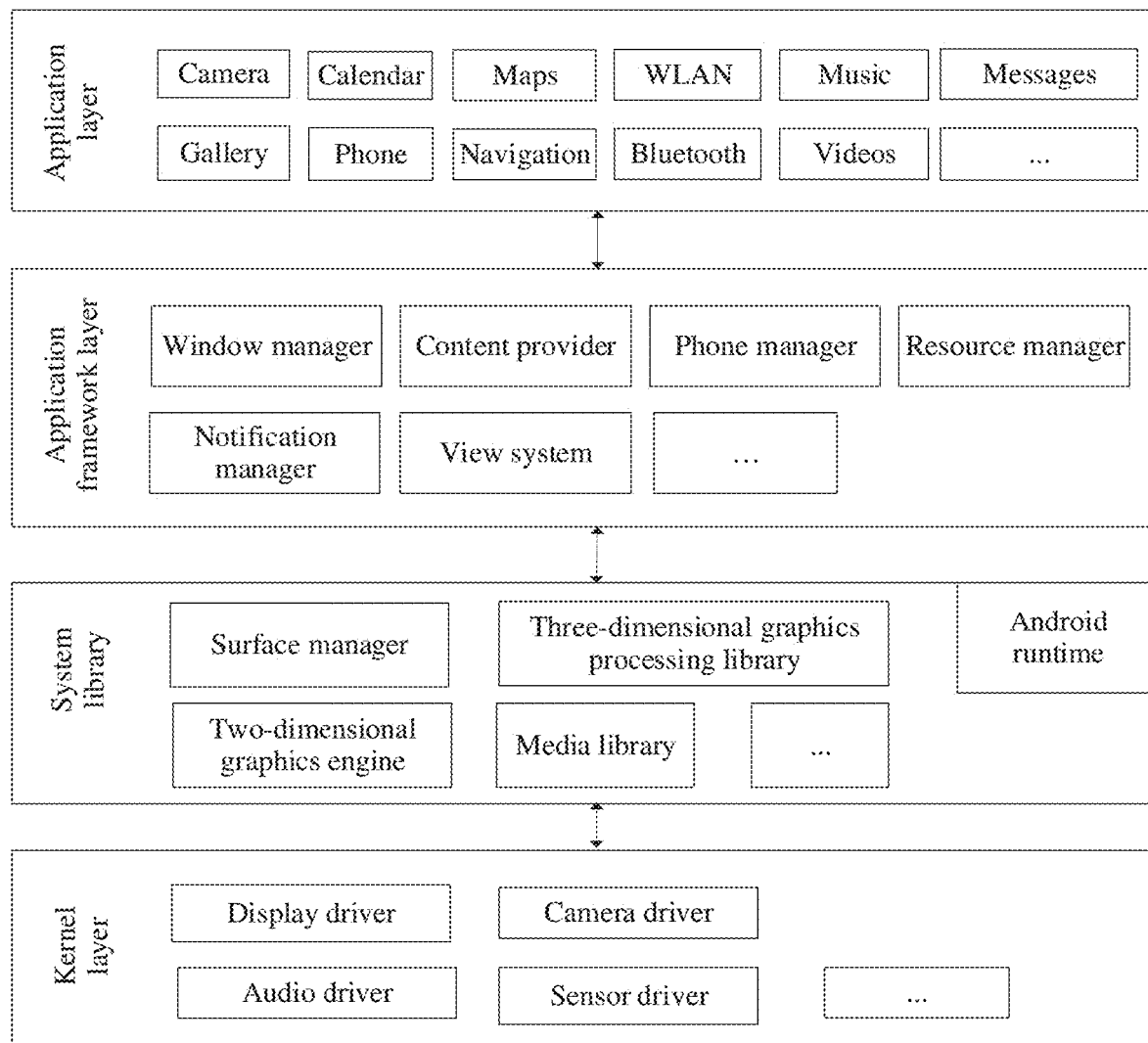
FIG. 4 is a schematic diagram of a software structure of a mobile phone 100 according to an embodiment of this disclosure.

FIG. 4 is a block diagram of a software structure of a mobile phone 100 according to an embodiment of this disclosure. As shown in FIG. 4, the software structure of the mobile phone 100 may be a layered architecture. For example, software may be divided into several layers, and each layer has a clear role and responsibility. The layers communicate with each other through a software interface. In some embodiments, an Android system is divided into four layers: an application layer, an application framework (FWK) layer, an Android runtime and system library, and a kernel layer from top to bottom.

The application layer may include a series of application packages. As shown in FIG. 4, the application layer may include a camera, WeChat, QQ, gallery, calendar, phone, maps, navigation, WLAN, Bluetooth, music, videos, and messages.

The application framework layer provides an application programming interface (API) and a programming framework for an application at the application layer. The application framework layer may include some predefined functions. As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to notify download completion, provide a message notification, and the like. The notification manager may alternatively be a notification that appears in the status bar at the top of a system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android. The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include a relative angle detection module, configured to detect a relative angle between another device and the mobile phone 100. The relative angle may include a position of the another device relative to the mobile phone 100, and the like.

The kernel layer is a layer between hardware and software. The kernel layer includes at least a display driver, a camera driver, an audio driver, and a sensor driver.

The following describes software and hardware working processes of the mobile phone 100 by using an example and a screen projection method in the embodiments of this disclosure.

In an example, the wireless communications module 152 in the mobile phone 100 is a Bluetooth antenna array. After receiving a signal broadcast by one or more other electronic devices, the Bluetooth antenna array sends related information of the received signal to the system library by using the kernel layer. The related information may be information about a time point at which each Bluetooth antenna in the Bluetooth antenna array receives the broadcast signal. The relative angle detection module in the system library may determine a relative angle between the mobile phone 100 and each of the one or more other electronic devices based on the related signal. The system library may further determine a target device from the one or more other electronic devices based on the relative angle between each of the other electronic devices and the mobile phone 100. For example, the system library may determine that another electronic device is the target device, where a relative angle between the another electronic device and the mobile phone 100 is in a preset angle range. After determining the target device, the system library may send information to the target device by using the wireless communications module 152.

In some other embodiments, after determining the target device, the system library may further send query information to the target device by using the wireless communications module 152. The query information is used to determine a capability of the target device through query (for example, query whether the target device has a screen display capability and/or whether the target device has an audio playback capability) through query. After receiving feedback information sent by the target device, the wireless communications module 152 in the mobile phone 100 may send the feedback information to the system library by using the kernel layer, and the system library determines the capability of the target device based on the feedback information. The feedback information may include capability information of the target device, for example, whether the target device has the screen display capability and/or whether the target device has the audio playback capability. After determining the capability of the target device, the system library may send, to the target device by using the wireless communications module 152, content that matches the capability of the target device.

For ease of understanding, a mobile phone 100 having the structure shown in FIG. 3 is used as an example in the following embodiments of this disclosure, and the screen projection method provided in the embodiments of this disclosure is specifically described with reference to the accompanying drawings.

Figure 5:
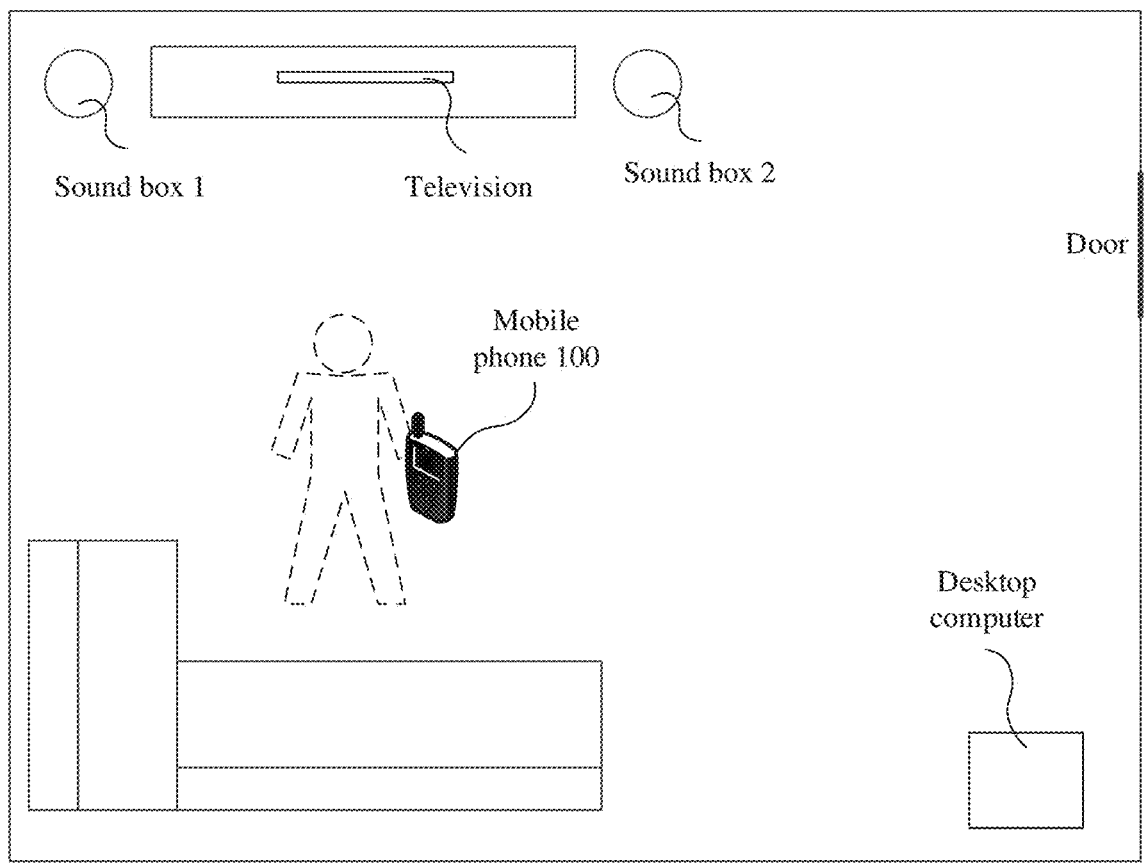
FIG. 5 is a schematic diagram of an application scenario according to an embodiment of this disclosure.

FIG. 5 is a schematic diagram of an application scenario according to an embodiment of this disclosure. As shown in FIG. 5, there are a plurality of other electronic devices around a mobile phone 100. In FIG. 5, an example in which the electronic devices around the mobile phone 100 include a television, a sound box, and a desktop computer is used. The mobile phone 100 may quickly position a target device from the several other electronic devices, then analyze a capability of the target device (for example, whether the target device has a screen display capability and an audio playback capability), and send, to the target device, content that matches the capability of the target device.

In some embodiments, FIG. 5 is used as an example. A function (which is briefly referred to as a function of positioning a target device in the following embodiments) of determining, by the mobile phone 100, a target device from a plurality of other electronic devices around the mobile phone 100 may be enabled or disabled. For example, the mobile phone 100 may receive an input operation by using an input device (for example, a display), and the input operation may be used to enable the function of automatically positioning a target device. Alternatively, the mobile phone 100 enables, by using a gesture operation (for example, an operation such as shaking, drawing a circle on a display, touching and holding, sliding, or tapping or double tapping by a knuckle), the function of automatically positioning a target device. In some embodiments, the mobile phone 100 may display, in a shortcut menu (for example, a control interface corresponding to a floating ball or a pull-up menu on a home screen), a control used to enable the function of automatically positioning a target device. When detecting an operation for the control, the mobile phone 100 enables the function of automatically positioning a target device. In another embodiment, when detecting an operation used to send content to another device, the mobile phone 100 enables the function of positioning a target device.

In some embodiments, after enabling the function of automatically positioning a target device, the mobile phone 100 may determine positions of the plurality of other electronic devices relative to the mobile phone 100 by using a positioning technology, and then determine a target device based on the position of each of the other electronic devices relative to the mobile phone 100. The positioning technology may be a Bluetooth-based positioning function and/or a WLAN-based positioning function. The Bluetooth-based positioning technology may be a Bluetooth-based angle of arrival (AOA) positioning technology, and the WLAN-based positioning technology may be a beam steering technology. The AOA positioning technology is used as an example, and the scenario shown in FIG. 5 is used as an example. When the mobile phone 100 and several electronic devices around the mobile phone 100 all enable Bluetooth, the mobile phone 100 may receive a Bluetooth signal broadcast by each of the several electronic devices, and then determine a position of each of the several electronic devices relative to the mobile phone 100 based on the Bluetooth signal. Then, the mobile phone 100 may determine a target device based on the position of each of the other electronic devices relative to the mobile phone 100. The AOA technology is described below.

The beam steering technology is used as an example, and the scenario shown in FIG. 5 is used as an example. When the mobile phone 100 and several electronic devices around the mobile phone 100 access same Wi-Fi, the mobile phone 100 may determine a position of each of the several electronic devices relative to the mobile phone 100 by using the beam steering technology. In some embodiments, the beam steering technology may be that a transmit end broadcasts a radio signal in each direction and signal strength of the radio information in all the directions is different. After receiving a radio signal broadcast by the transmit end, a receive end may determine a direction of the radio signal based on signal strength of the radio information, namely, a position of the transmit end relative to the receive end.

To facilitate determining of a position of another electronic device relative to the mobile phone 100 by the mobile phone 100, the following embodiments describe a concept of a relative angle. A relative angle between an electronic device and the mobile phone 100 may represent a position of the electronic device relative to the mobile phone 100.

Figure 6:
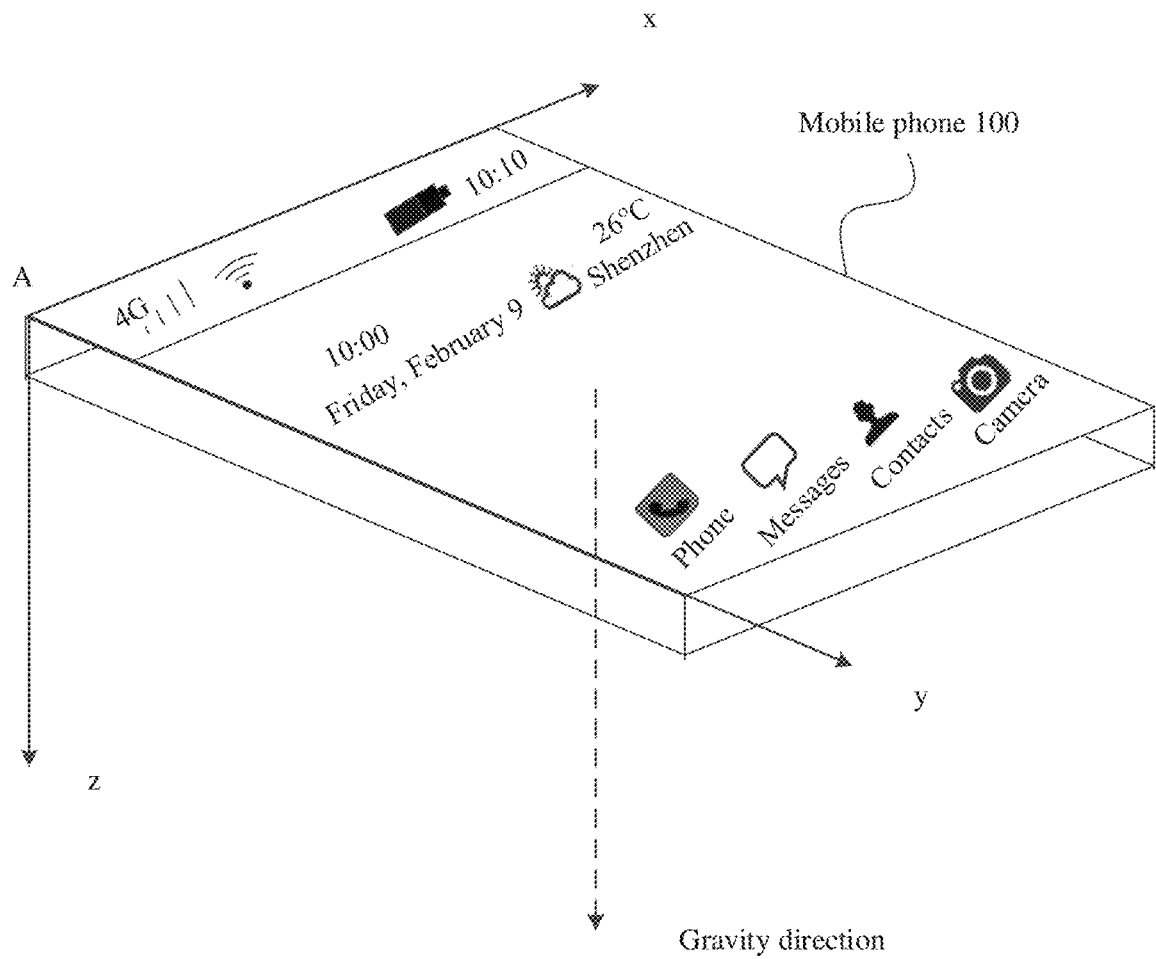
FIG. 6 is a schematic diagram of establishing a coordinate system by using a mobile phone 100 according to an embodiment of this disclosure.
Figure 7:
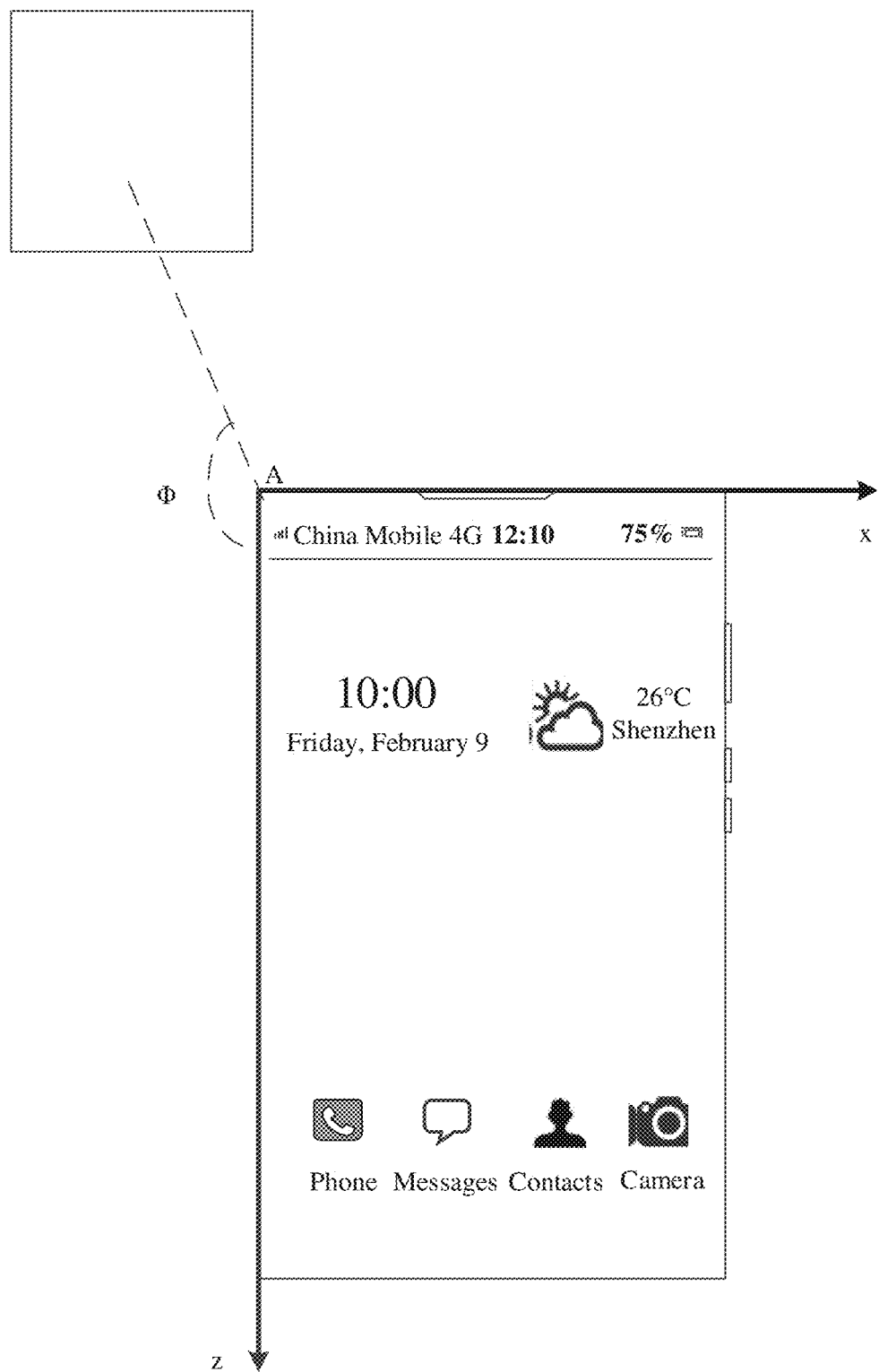
FIG. 7 is a schematic diagram of a relative angle between a device and a mobile phone 100 according to an embodiment of this disclosure.

FIG. 6 is a schematic diagram of establishing a coordinate system according to an embodiment of this disclosure. As shown in FIG. 6, a coordinate system x-y-z is established by using an edge point A of the mobile phone 100 as a coordinate origin, a short edge of the mobile phone 100 as an x-axis, and a long edge of the mobile phone 100 as a y-axis. In some embodiments, the relative angle may be an included angle between the another electronic device and the y-axis in the coordinate system that is shown in FIG. 6 and that is established by using the mobile phone 100. Alternatively, the relative angle may be an included angle between the another electronic device and the x-axis in the coordinate system that is shown in FIG. 5 and that is established by using the mobile phone 100. In the following embodiments, an example in which the relative angle is the included angle between the another electronic device and the y-axis in the coordinate system shown in FIG. 6 is used. For example, referring to FIG. 7, the relative angle between the another electronic device and the mobile phone 100 is Φ, namely, the relative angle between the another electronic device and the mobile phone 100.

In the following embodiments, the Bluetooth AOA technology is used as an example to describe a process in which the mobile phone 100 determines the relative angle between the another electronic device and the mobile phone 100.

In some embodiments, an antenna array may be disposed in the mobile phone 100, and the antenna array may include at least two antennas (Bluetooth antennas) to implement the AOA positioning technology. FIG. 8(a) shows a possible structure of the mobile phone 100. As shown in FIG. 8(a), an example in which the antenna array in the mobile phone 100 includes two antennas is used, and the two antennas are respectively an antenna 1 and an antenna 2. The antenna 1 and the antenna 2 each receive a signal (such as an electromagnetic wave signal) sent by a candidate device. Because the antenna 1 and the antenna 2 are disposed at different positions, there is a phase difference between the received electromagnetic waves. For example, referring to FIG. 8(b), a waveform 1 is a waveform of the electromagnetic wave received by the antenna 1, and a waveform 2 is a waveform of the electromagnetic wave received by the antenna 2. A phase difference is generated between the waveform 2 and the waveform 1. The mobile phone 100 may determine a time difference t by using the phase difference. The time difference t is a difference between time points at which the antenna 1 and the antenna 2 in the mobile phone 100 receive the electromagnetic wave sent by the device. The mobile phone 100 may determine, according to the L=c*t, a difference d between distances of the electromagnetic wave from the device to the antenna 1 and the antenna 2 in the mobile phone 100. The mobile phone 100 may determine a distance D (for example, the distance D between the antenna 1 and the antenna 2 may be pre-stored in the mobile phone 100) between the antenna 1 and the antenna 2. The mobile phone 100 may determine an included angle $\partial$ between a transmission direction of the electromagnetic wave and a connection line between the antenna 1 and the antenna 2 based on d, D, and a trigonometric function relationship. For example, the mobile phone 100 may determine the included angle $\partial$ between the transmission direction and the connection line between the antenna 1 and the antenna 2 according to $\cos \partial = d/D$.

Figure 9:
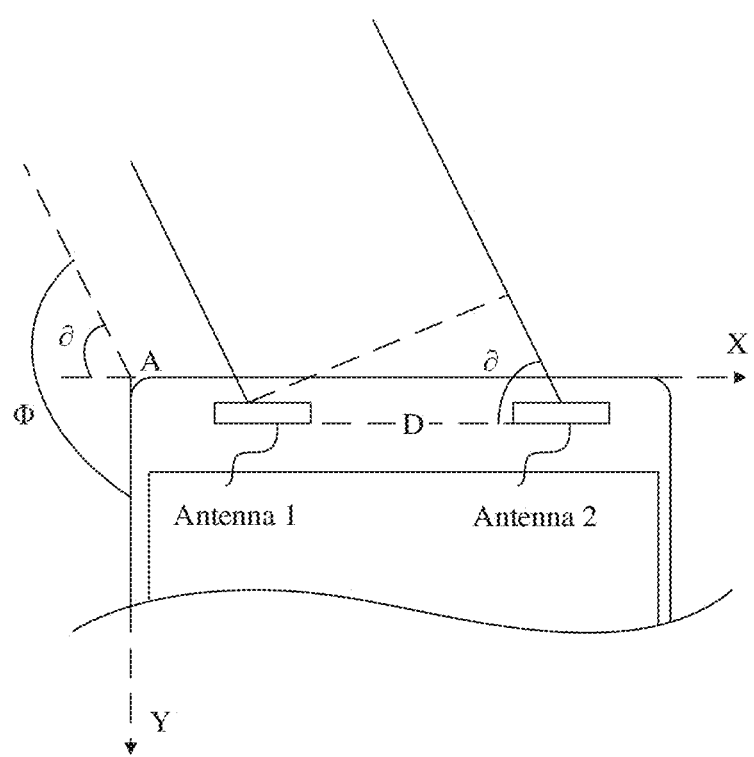
FIG. 9 is a schematic diagram of determining, by a mobile phone 100, a relative angle between a device and the mobile phone 100 according to an embodiment of this disclosure.

In some embodiments, after determining the included angle $\partial$, the mobile phone 100 may determine, based on the included angle $\partial$, the included angle Φ, namely, the relative angle, between the another electronic device and the y-axis in the coordinate system that is shown in FIG. 6 and that is established by using the mobile phone 100. As shown in FIG. 9, for example, the angle θ is an included angle between the transmission direction of the electromagnetic wave and the x-axis. Therefore, an included angle between the transmission direction of the electromagnetic wave and the y-axis is Φ=90+$\partial$, and Φ is the relative angle between the another electronic device and the mobile phone 100. For example, if the angle $\partial$ is 80 degrees, the relative angle between the electronic device and the mobile phone 100 is Φ=170 degrees.

In some embodiments, after determining the relative angle between the another electronic device and the mobile phone 100, the mobile phone 100 may determine, based on the relative angle, whether the another electronic device is a target device. In a possible case, if the mobile phone 100 detects only one relative angle, and the relative angle is a relative angle between another electronic device and the mobile phone 100, the another electronic device is a target device by default. In another possible case, if the mobile phone 100 detects several relative angles, and each relative angle corresponds to one another electronic device, the mobile phone 100 may determine a relative angle from the several relative angles. For example, the mobile phone 100 determines a relative angle that is in a preset angle range, or determines a relative angle that is in the several relative angles and that is closest to 180 degrees, for example, equal to 180 degrees. The mobile phone 100 may use another electronic device corresponding to the determined relative angle as a target device.

The scenario shown in FIG. 5 is used as an example. Assuming that the mobile phone 100 and the other electronic devices around the mobile phone 100 all enable Bluetooth, the mobile phone 100 may determine a relative angle between each of the other electronic devices and the mobile phone 100. Therefore, the mobile phone 100 may obtain a plurality of relative angles. The mobile phone 100 may determine, from the several relative angles, a relative angle that is in the preset angle range, and an electronic device corresponding to the relative angle is a target device. Alternatively, the mobile phone 100 may determine a relative angle equal to 180 degrees, and an electronic device corresponding to the relative angle is a target device.

In some other embodiments, to improve accuracy of determining a target device, the mobile phone 100 may detect, by using a gyroscope, whether the mobile phone 100 is horizontal. For example, as shown in FIG. 6, when detecting, by using the gyroscope, that a gravity direction of the mobile phone 100 is perpendicular to an x-y plane in the x-y-z coordinate system, the mobile phone 100 may determine that the mobile phone 100 is horizontal. After determining that the mobile phone 100 is horizontal, the mobile phone 100 detects the relative angles between the mobile phone 100 and the electronic devices around the mobile phone 100, and then determines the target device based on the relative angles.

Figure 10:
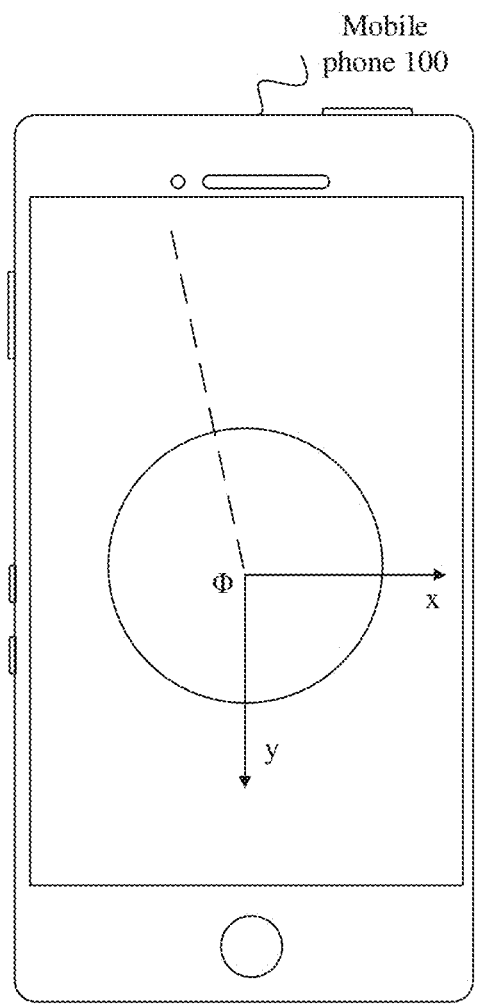
FIG. 10 is a schematic diagram of a user graphic interface according to an embodiment of this disclosure.

FIG. 10 is a schematic diagram of a graphical user interface of a mobile phone 100. As shown in FIG. 10, the mobile phone 100 displays a relative angle (an included angle Φ between a dashed line and the y-axis) between another device and the mobile phone 100. The mobile phone 100 may detect the relative angle between the another device and the mobile phone 100 in real time. Therefore, when a position of the mobile phone 100 or the another device changes, the relative angle between the mobile phone 100 and the another device changes. When the relative angle between the mobile phone 100 and the another electronic device changes, the included angle between the dashed line and the y-axis in the figure changes. In the following embodiments, the mobile phone 100 refers a state, in which a relative angle between the mobile phone 100 and a device is in the preset angle range (for example, 175 degrees to 185 degrees), as a state in which the mobile phone 100 is "aligned" with the device.

Figure 11A:
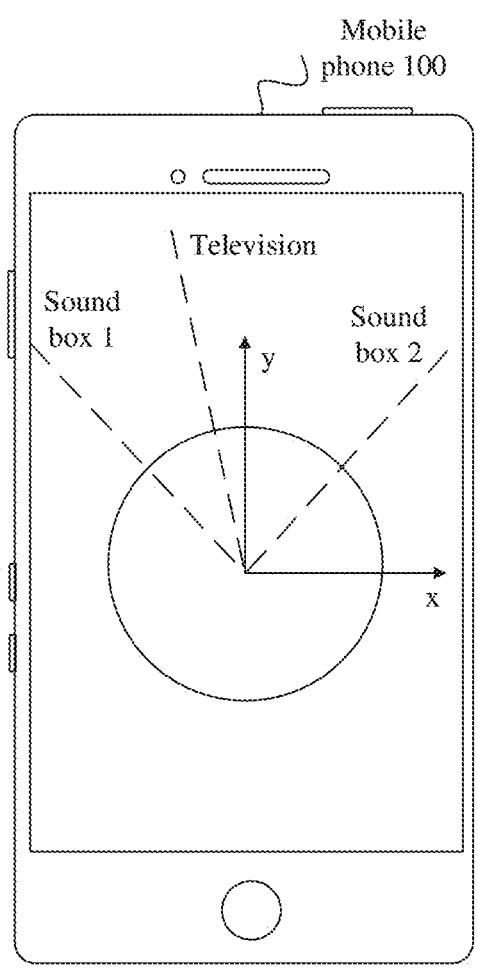
FIG. 11A is a schematic diagram of a user graphic interface according to an embodiment of this disclosure.

For example, in the scenario shown in FIG. 5, the mobile phone 100 is located in a living room at home, and a plurality of electronic devices such as a television and two sound boxes next to the television are disposed in the living room. In some examples, the mobile phone 100, the television, and the two sound boxes all enable Bluetooth. The mobile phone 100 detects a relative angle between the mobile phone 100 and each of the television and each sound box. FIG. 11A is a schematic diagram of another graphical user interface of a mobile phone 100. As shown in FIG. 11A, the mobile phone 100 displays relative angles between several devices and the mobile phone 100. In some examples, one dashed line may correspond to one device. For example, one identifier such as one device identifier may be added to one dashed line. In a process in which a user holds the mobile phone 100 to move, the mobile phone 100 may display a relative angle (for example, an angle between the dashed line and the y-axis) between each electronic device and the mobile phone 100. The mobile phone 100 may determine a target device from the plurality of electronic devices, where a relative angle between the target device and the mobile phone 100 is in the preset range, or a relative angle between the target device and the mobile phone 100 is closest to 180 degrees. From the perspective of the user, if the user wants to project content of the mobile phone 100 on the television, the user may align the mobile phone 100 with the television. In this case, if the mobile phone 100 detects that a relative angle between the television and the mobile phone 100 is relatively small or is in the preset range, the mobile phone 100 may project the content on the television.

Figure 11B:
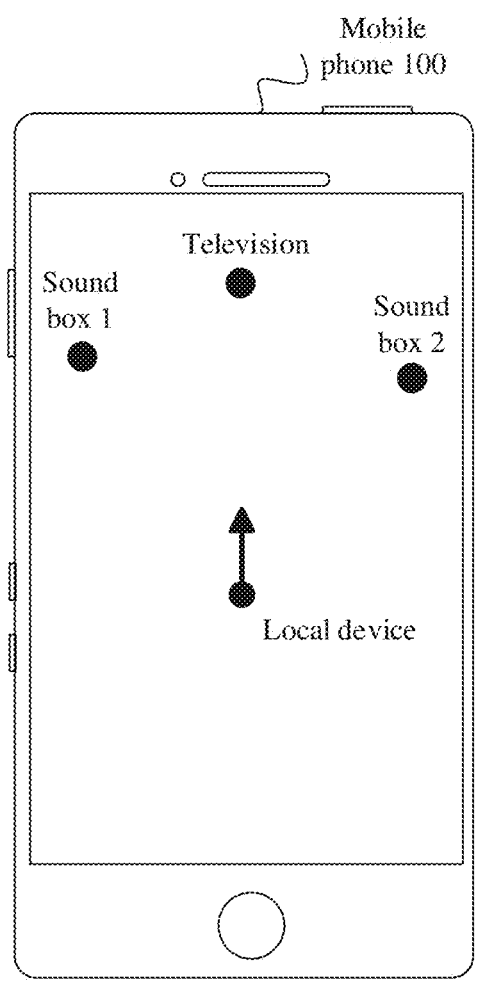
FIG. 11B is a schematic diagram of a user graphic interface according to an embodiment of this disclosure.

FIG. 11B is a schematic diagram of another graphical user interface of a mobile phone 100. As shown in FIG. 11B, the mobile phone 100 displays a local device identifier and device identifiers of the other electronic devices around the mobile phone 100. The device identifiers of the other electronic devices are distributed around the local device identifier based on the relative angles between the other electronic devices and the local device. In other words, distribution of the device identifiers in the interface shown in FIG. 11B may reflect distribution of the mobile phone 100 and the electronic devices around the mobile phone 100 in a real environment. A direction arrow may be displayed on the local device identifier, and a pointing direction of the arrow may change when the mobile phone 100 moves. For example, when the mobile phone 100 directly faces the television, the direction arrow points to a device identifier of the television, and it indicates that the mobile phone 100 is "aligned" with the television.

In some embodiments, when the mobile phone 100 enables Bluetooth and the other electronic devices around the mobile phone 100 also enable Bluetooth, the mobile phone 100 may determine the relative angle between each of the several other electronic devices and the mobile phone 100 based on the foregoing Bluetooth AOA technology, and then select a target device from the several other electronic devices, where a relative angle between the target device and the mobile phone 100 is in the preset angle range. In some other embodiments, when the mobile phone 100 does not enable Bluetooth but enables Wi-Fi, the several other electronic devices also enable Wi-Fi, and the mobile phone 100 determines that the several other electronic devices and the mobile phone 100 access same Wi-Fi, the mobile phone 100 may determine, in another manner (for example, the beam steering technology), the relative angle between each of the several other electronic devices and the mobile phone 100. In another embodiment, when the mobile phone 100 enables Bluetooth and/or Wi-Fi and the other electronic devices around the mobile phone 100 do not enable Bluetooth and Wi-Fi, the mobile phone 100 cannot position the relative angles between the other electronic devices and the mobile phone 100. In some examples, the display of the mobile phone 100 may display the device identifiers that are of the other electronic devices and that can be used to determine the relative angles. If the device identifiers do not include a device identifier of a target device that the user expects to select, it indicates that the target device is possibly not powered on or is possibly powered on but does not enable Bluetooth or Wi-Fi. The user may manually power on the target device, or enable the Bluetooth function of the target device.

Figure 2:
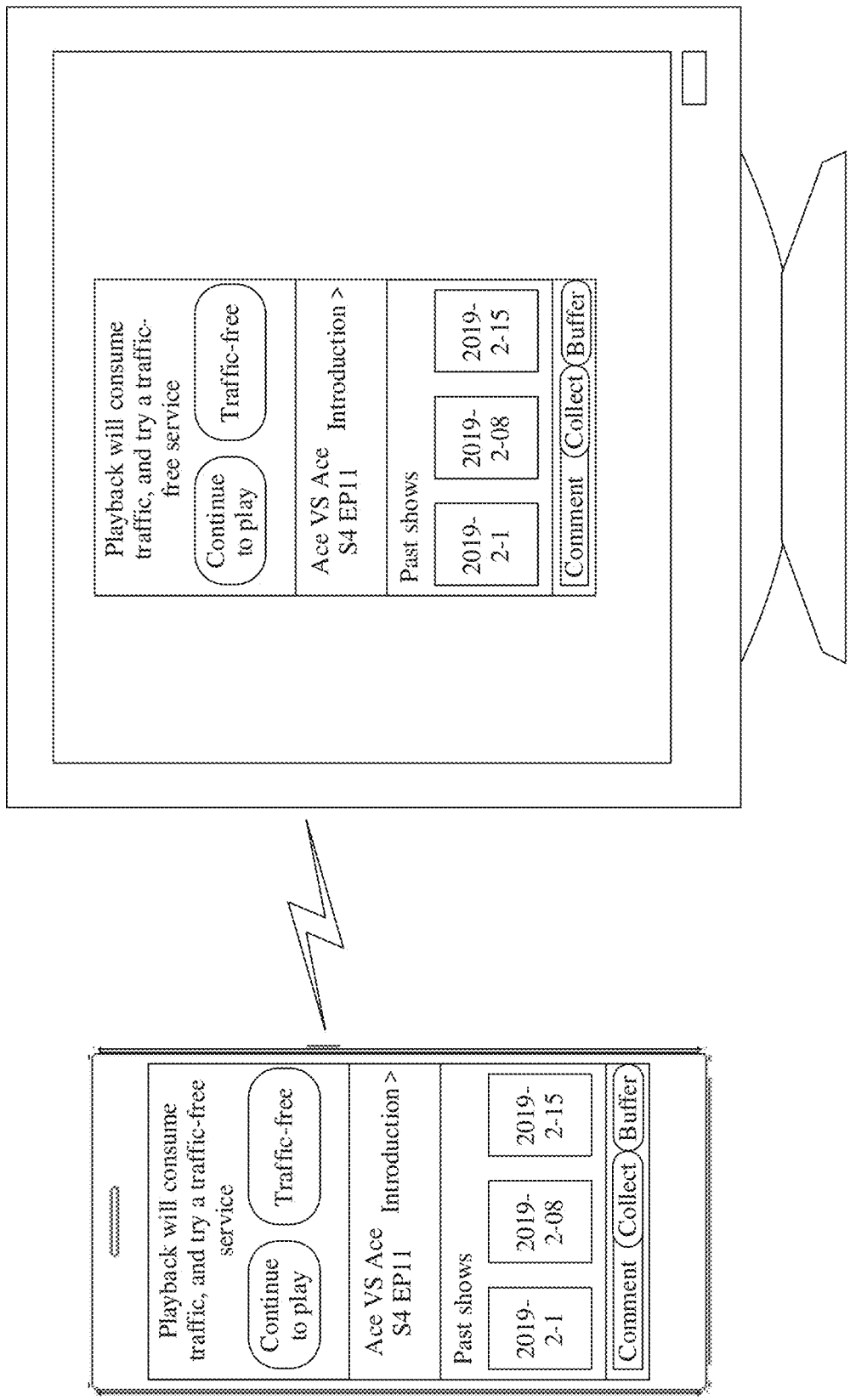
FIG. 2 is a schematic diagram of projecting a screen on a desktop computer by a mobile phone according to an embodiment of this disclosure.

As shown in FIG. 1, in a conventional technology, after the mobile phone 100 enables a screen projection function, the mobile phone 100 scans a device near the mobile phone 100, and displays a list. The list includes device identifiers of all optional electronic devices. The user needs to manually select the device identifier of the target device from the list. Operations are complex. In this embodiment of this disclosure, the mobile phone 100 may automatically select the target device from the several electronic devices, to facilitate user operations.

In some embodiments, after the mobile phone 100 detects the relative angles between the mobile phone 100 and the several other electronic devices around the mobile phone 100 by using the AOA technology, and determines the target device based on the relative angles, the mobile phone 100 may not establish a Bluetooth connection to the target device. In some examples, after detecting that the mobile phone 100 is "aligned" with the target device, the mobile phone 100 may automatically establish a Bluetooth connection to the target device. For example, the mobile phone 100 may automatically send pairing code to the target device to establish a Bluetooth connection to the target device. In some other embodiments, after detecting that the mobile phone 100 is "aligned" with the target device, the mobile phone 100 may output prompt information to prompt the user whether to establish a Bluetooth connection to the target device (for example, when the mobile phone 100 determines that the mobile phone 100 is aligned with the television, the display of the mobile phone 100 displays "whether to connect to the television"). After receiving an instruction of determining to connect to the target device, the mobile phone 100 establishes a Bluetooth connection to the target device. In some other embodiments, when the mobile phone 100 detects that the mobile phone 100 is "aligned" with the target device, and alignment duration exceeds preset duration, the mobile phone 100 automatically connects to the target device. In some other embodiments, after determining the target device, when detecting an operation used to trigger content sharing/projection, the mobile phone 100 automatically connects to the target device, and then shares content with or projects content on the target device.

In some embodiments, the mobile phone 100 may detect an operation used to trigger screen projection, and then execute a process of determining a target device. After determining the target device, the mobile phone 100 connects to the target device, and send content to the target device. For example, referring to FIG. 12, the mobile phone 100 displays a GUI, and the GUI may be referred to as a home screen 701. In some embodiments, the mobile phone 100 may include a plurality of home screens, and each home screen includes an icon of one or more applications. After detecting a screen projection operation on the home screen 701, the mobile phone 100 may enable the function of determining a target device. There may be a plurality of screen projection operations. For example, referring to FIG. 12, the screen projection operation may be an operation that three fingers slide upward simultaneously on the display. For another example, referring to FIG. 13(a), the screen projection operation may be an operation that two fingers press the display and slide upward simultaneously, or an operation that at least one finger touches and holds the display and slides upward without an interval after the touching and holding. For another example, referring to FIG. 13(b), the screen projection operation may be an operation that a knuckle touches and holds the display and slides upward without an interval after the touching and holding, or an operation that at least two knuckles slide upward on the display simultaneously, or an operation that at least two knuckles touch and hold the display and slide upward without an interval after the touching and holding. For another example, referring to FIG. 13(c), the screen projection operation may be an operation that a palm touches/slides upward on/touches and holds/pats the display. Alternatively, the screen projection operation may be an operation that a palm slides above the display (not in contact with the display) and that is captured by the mobile phone 100 by using a camera. Certainly, the screen projection operation may be an operation of shaking the mobile phone 100 or the like. This is not limited in this embodiment of this disclosure.

In some embodiments, after detecting the screen projection operation, the mobile phone 100 may execute, in background, the process of determining a target device. For example, the mobile phone 100 determines that an electronic device is the target device, where a relative angle between the electronic device and the mobile phone 100 is currently in the preset angle range. After determining the target device, the mobile phone 100 may establish a connection to the target device, and automatically send screen projection content to the target device. Therefore, in this embodiment, from the perspective of the user, when the user projects a screen on a device by using the mobile phone 100, the user only needs to align the mobile phone 100 with the device, and then performs a screen projection operation on the mobile phone 100, to complete screen projection, and a process in which the user manually connects the mobile phone 100 to the device is not required.

In some other embodiments, after detecting the screen projection operation and determining the target device in background, the mobile phone 100 may provide prompt information in foreground. For example, when determining, in background, that the target device is the television, the mobile phone 100 may output text information such as "establish a connection to the television" in foreground, and then automatically send content to the television. Alternatively, when determining, in background, that the target device is the television, the mobile phone 100 may output text information "whether to connect to the television" in foreground. After receiving a determining instruction, the mobile phone 100 connects to the television, and then sends content to the television.

In some embodiments, when the user aligns the mobile phone 100 with a device through self-perception and the user performs a screen projection operation on the mobile phone 100, the mobile phone 100 may not implement screen projection. For example, the target device is not powered on, or the target device is powered on but does not enable the Bluetooth function. Therefore, the mobile phone 100 cannot detect a relative angle between the device and the mobile phone 100. The mobile phone 100 may output prompt information, and the prompt information is, for example, "no target device is detected". In this case, the user may manually power on the target device, or manually enable the Bluetooth function of the target device.

Figure 14:
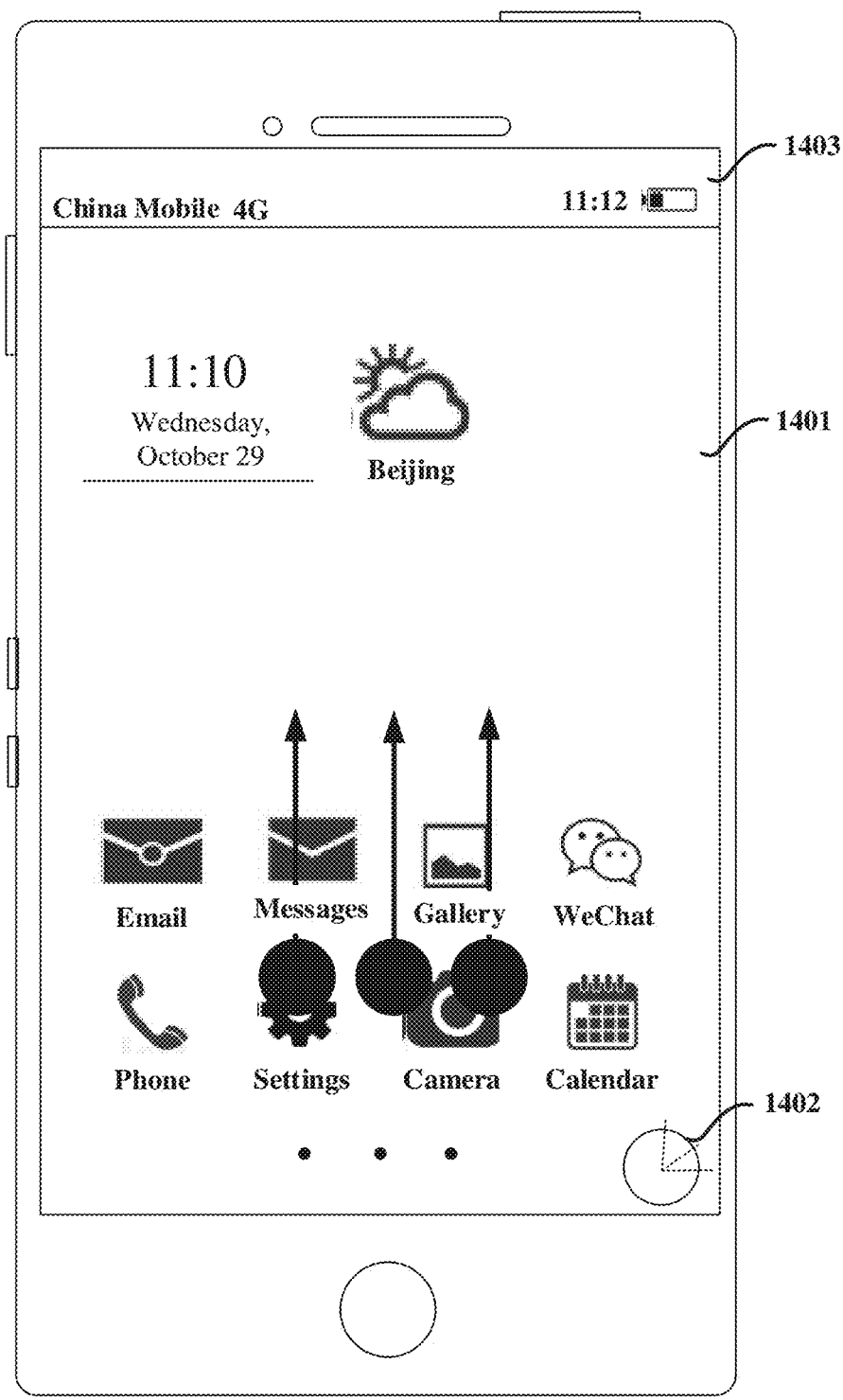
FIG. 14 is a schematic diagram of a user graphic interface according to an embodiment of this disclosure.

In some other embodiments, after enabling the function of automatically positioning a target device, the mobile phone 100 may display an icon/window in a current display interface (for example, a home screen or an interface of an application), and the icon/window is used to display relative angles between several other electronic devices and the mobile phone 100. For example, referring to FIG. 14, the mobile phone 100 displays a home screen 1401, and an icon/window 1402 is displayed on the home screen 1401. The icon/window 1402 is used to display a relative angle between another electronic device and the mobile phone 100. In some embodiments, the icon/window 1402 may be an interface obtained by scaling down the interface shown in FIG. 11A. The user may align, by using the icon/window, the mobile phone 100 with a target device on which a screen is to be projected. After determining the target device, the mobile phone 100 automatically establishes a connection to the target device, and then sends to-be-projected content (for example, a home screen) to the target device.

In some embodiments, the mobile phone 100 may display the icon 1402 at a proper position, for example, may display the icon 1402 in a status information bar 1403 or at any other position.

In some other embodiments, when displaying an interface (for example, a home screen or an interface of an application), the mobile phone 100 detects an input operation, enables the function of automatically positioning a target device, and displays the interface shown in FIG. 11A. After determining the target device and establishing a connection to the target device, the mobile phone 100 may return to a previous-level interface, namely, the interface. After returning to the previous-level interface, the mobile phone 100 sends to-be-projected content to the target device based on the detected screen projection operation.

Figure 15A:
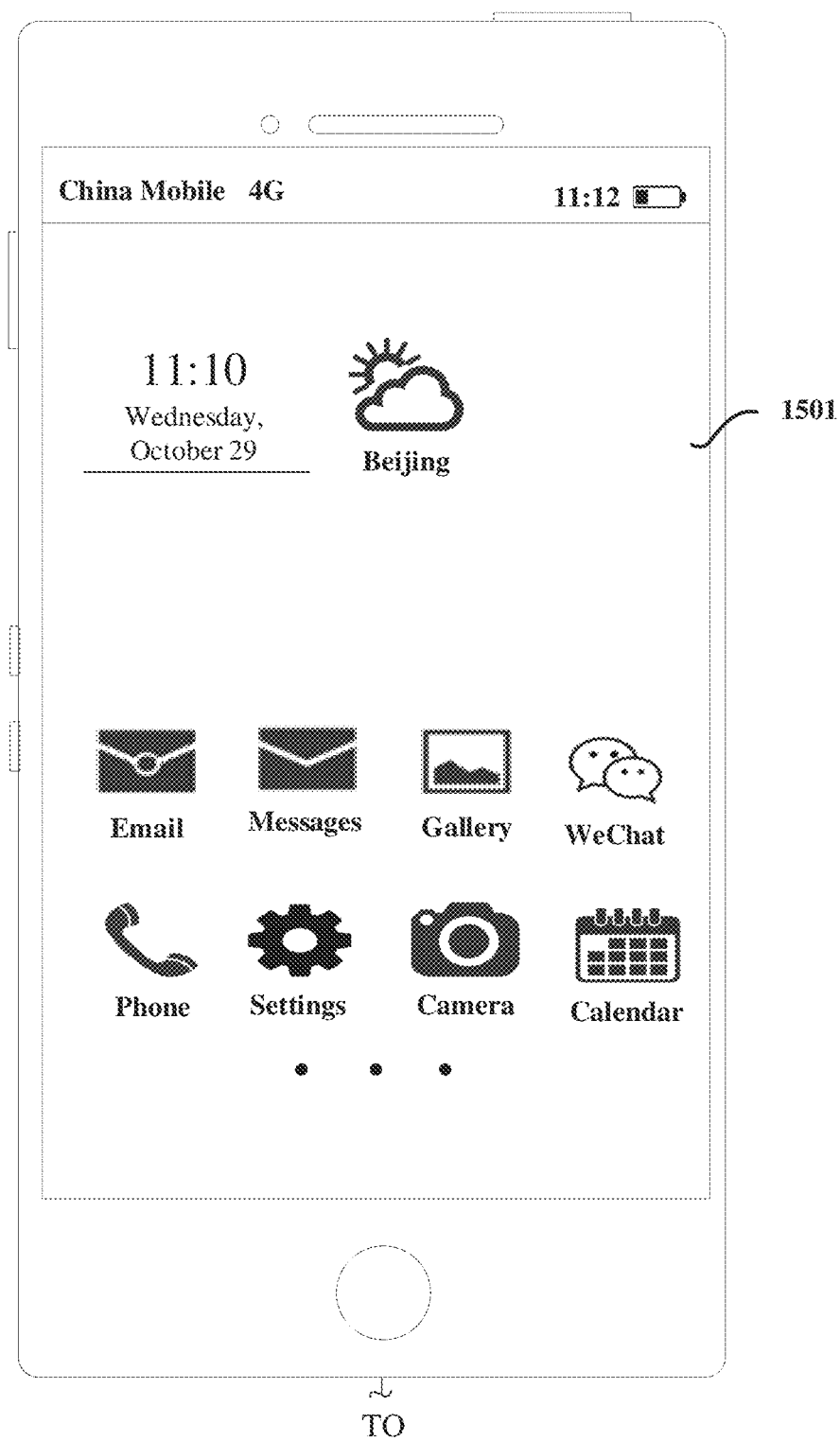
FIG. 15($a$) to FIG. 15($c$) are a schematic diagram of a user graphic interface according to an embodiment of this disclosure.
Figure 15B:
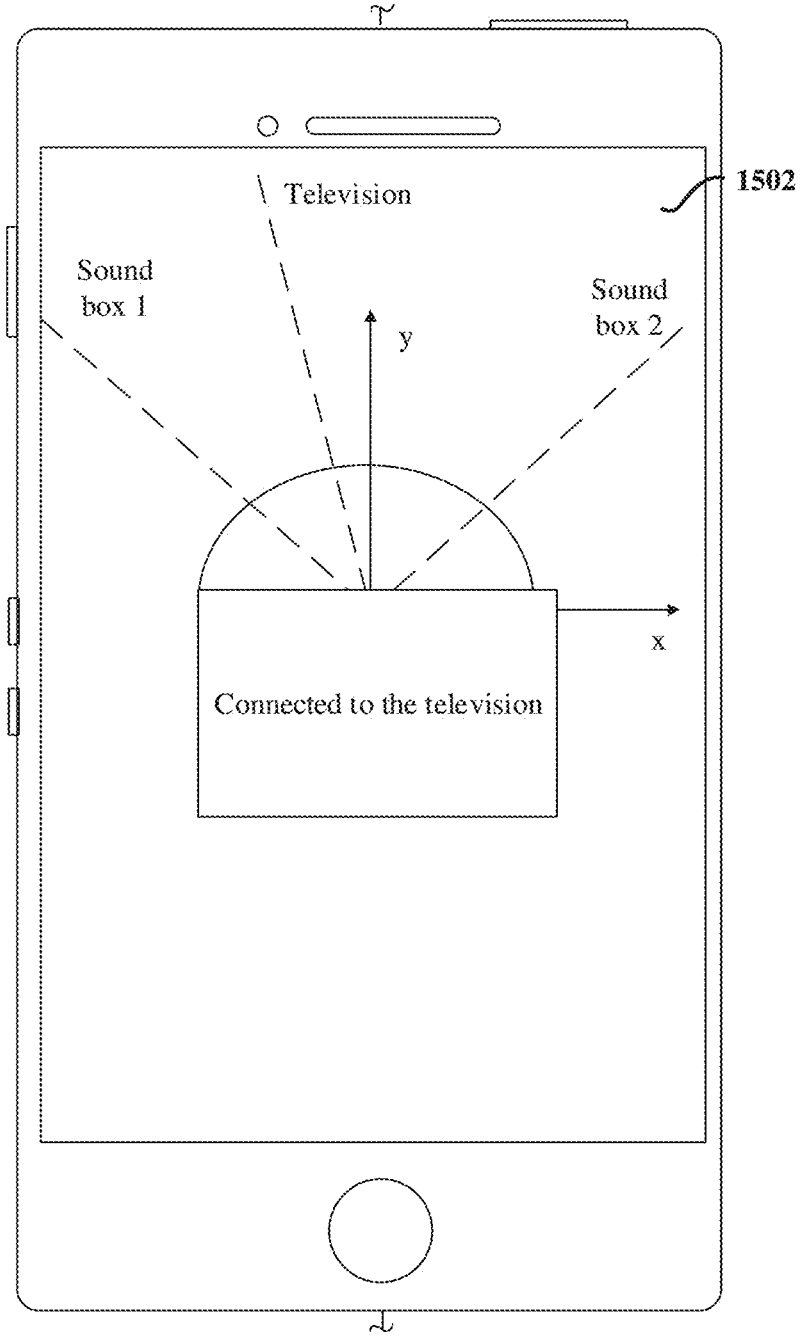
Figure 15C:
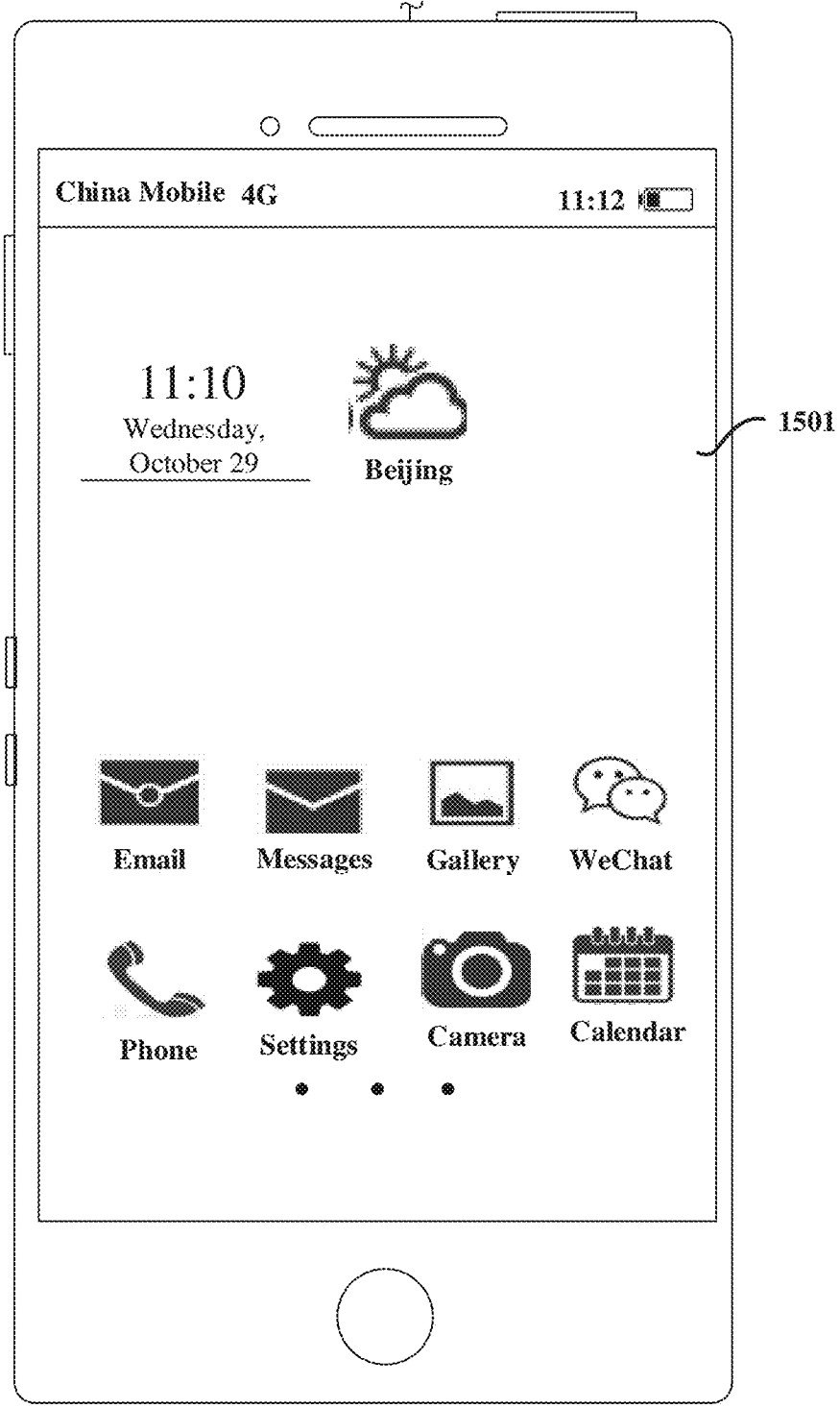

For example, referring to FIG. 15(a), the mobile phone 100 displays a home screen 1501. The mobile phone 100 detects an input operation, and the input operation may be, for example, tapping an icon in a shortcut menu (for example, a pull-up menu or a control interface corresponding to a floating button). In response to the input operation, the mobile phone 100 displays an interface 1502 shown in FIG. 15(b). The interface 1502 displays a relative angle between the mobile phone 100 and one or more other electronic devices (for example, the television and the sound boxes in the scenario shown in FIG. 5). In some embodiments, after determining the target device, the mobile phone 100 may output prompt information, for example, output text information "aligned with the television and whether to connect to the television". After receiving a determining instruction, the mobile phone 100 automatically connects to the television. In some other embodiments, after determining the target device, the mobile phone 100 automatically connects to the target device, and then outputs prompt information, for example, outputs "connected to the television". Referring to FIG. 15(c), after connecting to the target device, the mobile phone 100 may automatically return to the home screen 1501, so that the user selects content to be projected on the target device.

In some embodiments, after detecting the screen projection operation, the mobile phone 100 may send related information of a currently running application to the target device without considering a capability of the target device. For example, when the mobile phone 100 is displaying an interface of a non-media playback application (for example, displaying a home screen or a display interface of an instant messaging application), an audio playback module in the mobile phone 100 plays an audio file, for example, a media playback application running in background of the mobile phone 100 plays the audio file. In this case, after detecting the screen projection operation, the mobile phone 100 may send both the currently played audio file and currently displayed display information to the target device. If the target device has a screen display capability, the target device displays the display information. If the target device has an audio playback capability, the target device plays the audio file. In this example, the mobile phone 100 does not need to consider the capability of the target device, but sends both the currently played audio file and the currently displayed content to the target device, and the target device chooses to play/display corresponding content based on the capability of the target device.

In some other examples, an example in which the mobile phone 100 is displaying an interface of a non-media playback application and a media playback application running in background of the mobile phone 100 plays an audio file is still used. After detecting the screen projection operation, the mobile phone 100 may output prompt information, and the prompt information is used to prompt the user to send the currently played audio file or currently displayed display information to the target device. If detecting that the user selects the audio file, the mobile phone 100 sends the audio file to the target device. If detecting the display information, the mobile phone 100 sends the display information to the target device.

In some other embodiments, before transmitting content to/projecting content on the target device, the mobile phone 100 may further detect the capability of the target device, and then transmit/project, to/on the target device based on the capability of the target device, content that matches the capability. The capability that is of the target device and that is identified by the mobile phone 100 may include at least one of the following capabilities:

whether the target device and the mobile phone 100 have a same operating system (for example, an Android operating system or an iOS operating system), whether the target device has the screen display capability (for example, whether the target device has a display and whether the display is lit up), whether the target device has the audio playback capability (for example, whether the target device has a loudspeaker and whether the loudspeaker is muted). For example, if determining that the target device has no audio playback capability, the mobile phone 100 may not need to send the audio file to the target device. Alternatively, if determining that the target device has no screen display capability, the mobile phone 100 may not need to send the display content to the target device.

In some embodiments, the mobile phone 100 may determine the capability of the target device based on a device type of the target device. For example, if the target device is a television, the target device has the screen display capability and the audio playback capability. For another example, if the target device is a sound box, the target device has the audio playback capability.

In some other embodiments, after connecting to the target device, the mobile phone 100 may send query information to the target device, and the query information is used to determine the capability of the target device through query. For example, the query information may be used to determine an operating system of the target device through query, or the query information may be used to query whether the target device has a display and whether the display is lit up, and/or whether the target device has an audio playback module (for example, a loudspeaker) and whether the audio playback module is enabled (whether the loudspeaker is muted). In some examples, the query information may be information encapsulated by the mobile phone 100 by using a Bluetooth protocol, a screen projection protocol, or the like. The screen projection protocol may be a digital living network alliance (DLNA) A protocol, a Miracast protocol, or the like. This is not limited in this embodiment of this disclosure. Generally, the information encapsulated by using the protocol may include a plurality of fields, and the fields may carry different information. In this embodiment of this disclosure, the query information may be added to a field in the information encapsulated by using the protocol, and the query information may be used to query whether the target device has a display and whether the display is lit up, and/or whether the target device has an audio playback module and whether the audio playback module is enabled. After receiving the query information sent by the mobile phone 100, the target device may send feedback information to the mobile phone 100. The feedback information may also be information encapsulated by using the Bluetooth protocol or the screen projection protocol, and a field in the information carries capability information of the target device. For example, the capability information may be that the target device has a display and the display is lit up/turned off, and/or that the target device has an audio playback module and the audio playback module is enabled/disabled. The mobile phone 100 receives the feedback information sent by the target device, and may determine the capability of the target device based on the feedback information.

In another embodiment, after the mobile phone 100 connects to the target device, the target device may actively send the capability information to the mobile phone 100. For example, in the scenario shown in FIG. 5, the other electronic devices around the mobile phone 100, for example, the television, the sound box, or the desktop computer, may continuously broadcast capability information of the other electronic devices in real time. Therefore, the mobile phone 100 may know a capability of each electronic device around the mobile phone 100. After determining the target device from the plurality of electronic devices around the mobile phone 100, the mobile phone 100 does not need to send the query information to the target device.

The following embodiments describe a process in which the mobile phone 100 sends, to the target device, the content that matches the capability of the target device. The following is described by using different scenarios as an example.

Scenario 1: When the mobile phone 100 displays an interface of a non-media playback application (for example, displays a home screen or a display interface of an instant messaging application), the audio playback module in the mobile phone 100 plays an audio file, for example, a media playback application runs in background of the mobile phone 100. In some embodiments, when the mobile phone 100 determines that the target device has a display and the display is lit up, but the target device has no audio playback function, the mobile phone 100 may send only display information (for example, information on a home screen) to the target device (for example, send the display information to the target device by using a same-source screen projection technology), and does not need to send, to the target device, the audio information currently played by the mobile phone 100 (for example, send the audio information to the target device through a Bluetooth transmission channel). In this case, the target device displays only the display content (for example, a home screen) sent by the mobile phone 100, but does not play the audio information. In some other embodiments, when the mobile phone 100 determines that the target device has a display and the display is lit up, and the target device has the audio playback function (for example, a television), the mobile phone 100 may send display information (for example, a home screen) to the target device, and may further send, to the target device, the audio information played in background of the mobile phone 100. In this case, the target device displays the display content (for example, a home screen) of the mobile phone 100, and plays the audio information currently played by the mobile phone 100.

In still some other embodiments, after establishing a connection to the target device, the mobile phone 100 determines that the target device has a display but the display is turned off. In this case, the mobile phone 100 may send display information (for example, a home screen) to the target device. After receiving the display information, the target device may automatically light up the display and display the received display information. In still some other embodiments, when the mobile phone 100 determines that the target device has the audio playback function, the mobile phone 100 may send the audio file to the target device. After receiving the audio file, the target device may automatically enable the audio playback function and play the received audio file.

In some other embodiments, when the mobile phone 100 determines that the target device has no display but has the audio playback function (for example, the target device is a sound box), the mobile phone 100 may not need to send display information to the target device, but send, to the target device, the audio information currently played by the mobile phone 100. In this case, the target device may play the audio information currently played by the mobile phone 100.

Scenario 2: The mobile phone 100 displays a media playback interface. The media playback interface is, for example, a music playback interface (for example, a playback interface of KuGou) or a video playback interface (for example, a video playback interface of iQIYI). In some embodiments, when the mobile phone 100 displays the media playback interface, the audio playback module (for example, the loudspeaker) in the mobile phone 100 may synchronously play audio information. For example, the mobile phone 100 displays the playback interface of KuGou, and the audio playback module in the mobile phone 100 plays music.

In some embodiments, when the mobile phone 100 displays the media playback interface and the audio playback module (for example, the loudspeaker) plays audio information, the mobile phone 100 determines that the target device has a display and the display is lit up, and the target device has the audio playback function. When detecting an operation used to trigger sending of content to the target device, the mobile phone 100 may send the audio information and display information to the target device. For example, the mobile phone 100 may send the audio content and the display content of the mobile phone 100 to the target device by using a different-source screen projection technology. In some embodiments, that the mobile phone 100 sends the content to the target device by using the different-source screen projection technology may be sending the content to the target device in a video stream manner. In this way, when the target device displays the media playback interface, the audio playback module of the target device plays the audio information.

In some other embodiments, when the mobile phone 100 displays the media playback interface and the audio playback module (for example, the loudspeaker) plays audio information, the mobile phone 100 determines that the target device has a display and the display is lit up, but the target device has no audio playback function. When detecting an operation used to trigger sending of content to the target device, the mobile phone 100 may send only display content in the audio playback interface to the target device without sending the audio information to the target device.

Scenario 3: The mobile phone 100 displays a non-media playback interface (for example, a home screen or a chat interface of WeChat), and the music playback module in the mobile phone 100 does not play audio information. When the mobile phone 100 determines that the target device has a display and the display is lit up, the mobile phone 100 may send display information to the target device. For example, the mobile phone may send the display content (for example, transmit the display content in a picture stream manner) on the display of the mobile phone 100 to the target device by using a same-source screen projection technology. In some other embodiments, when the mobile phone 100 determines that the target device has no display or has a display but the display is turned off, the mobile phone 100 may not need to send display content to the target device.

Scenario 4: The mobile phone 100 displays an image (for example, a static image or a moving image). When the mobile phone 100 determines that the target device has a display and the display is lit up, the mobile phone 100 may send image information (for example, a picture or pixel information on an image) to the target device. In this case, the target device may display the image.

In some embodiments, after establishing a connection to the target device, the mobile phone 100 may further transmit a file such as a picture, a Word document, or a video to the target device by using a short-distance transmission technology (for example, a Bluetooth technology). In this process, the mobile phone 100 may consider whether an operating system of the target device is the same as an operating system of the local device. For example, the mobile phone 100 determines that the operating system of the target device is iOS and the operating system of the local device is Android. The mobile phone 100 currently displays an image. When detecting an operation used to send the image, the mobile phone 100 may recommend a "face-to-face" transmission manner to the user. For another example, when determining that both the operating system of the target device and the operating system of the local device are iOS, the mobile phone 100 may recommend an "over the air" manner. For another example, when the mobile phone 100 determines that both the operating system of the target device and the operating system of the local device are Android and both the target device and the local device are Huawei mobile phones, the mobile phone 100 may recommend a "Huawei share" manner. In this embodiment, the mobile phone 100 may recommend a proper transmission manner based on the operating system of the target device, and transmit file information to the target device in this manner.

Implementations of this disclosure may be randomly combined to achieve different technical effects.

Figure 16:
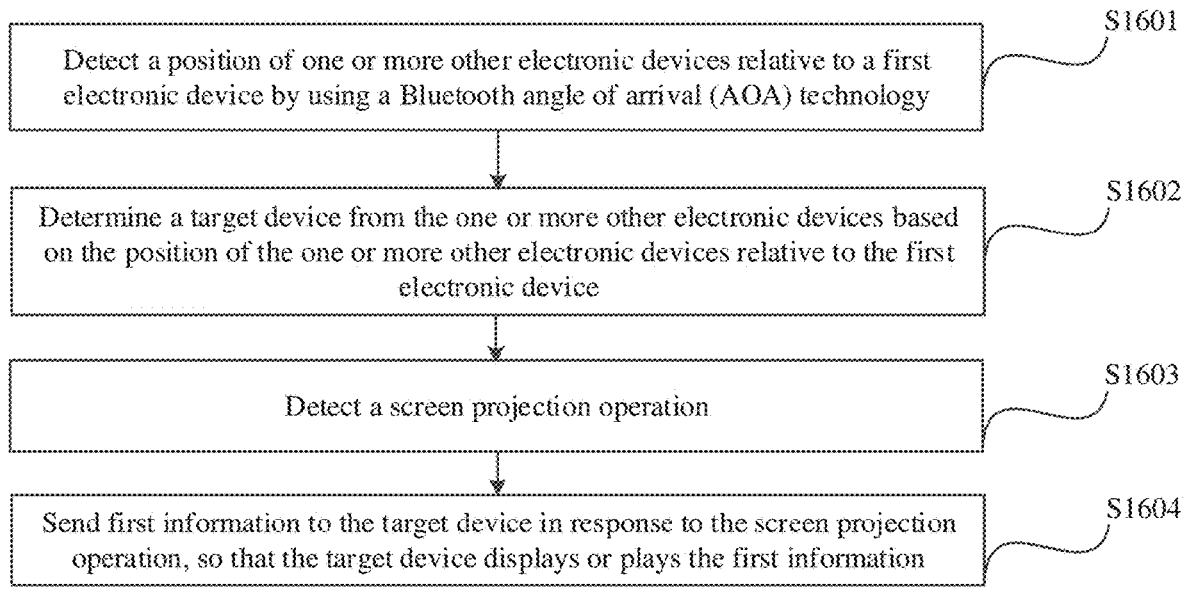
FIG. 16 is a schematic flowchart of a screen projection method according to an embodiment of this disclosure.

With reference to the foregoing embodiments and related accompanying drawings, an embodiment of this disclosure provides a screen projection method, and the method may be implemented in an electronic device (for example, a mobile phone or a tablet computer). For example, a structure of the electronic device may be shown in FIG. 3. As shown in FIG. 16, the method may include the following steps.

1601. Detect a position of one or more other electronic devices relative to the first electronic device by using a Bluetooth angle of arrival (AOA) technology.

For example, in FIG. 8(*a*) and FIG. 9, a Bluetooth antenna array may be disposed on the electronic device. The electronic device detects a relative angle of the one or more other electronic devices relative to the electronic device based on the Bluetooth AOA technology. A specific parameter is described above, and details are not described herein again.

1602. Determine a target device from the one or more other electronic devices based on the position of the one or more other electronic devices relative to the first electronic device.

For example, the electronic device may determine a target device that is in the one or more other electronic devices and that is in a preset position range, or determine a target device that is in the one or more other electronic devices and that is directly in front of the first electronic device. FIG. 11B is used as an example. When the electronic device is aligned with a television, an arrow on a local device identifier on a display of the electronic device points to a device identifier of the television. Therefore, the electronic device determines that the television is a target device.

1603. Detect a screen projection operation.

Figure 12:
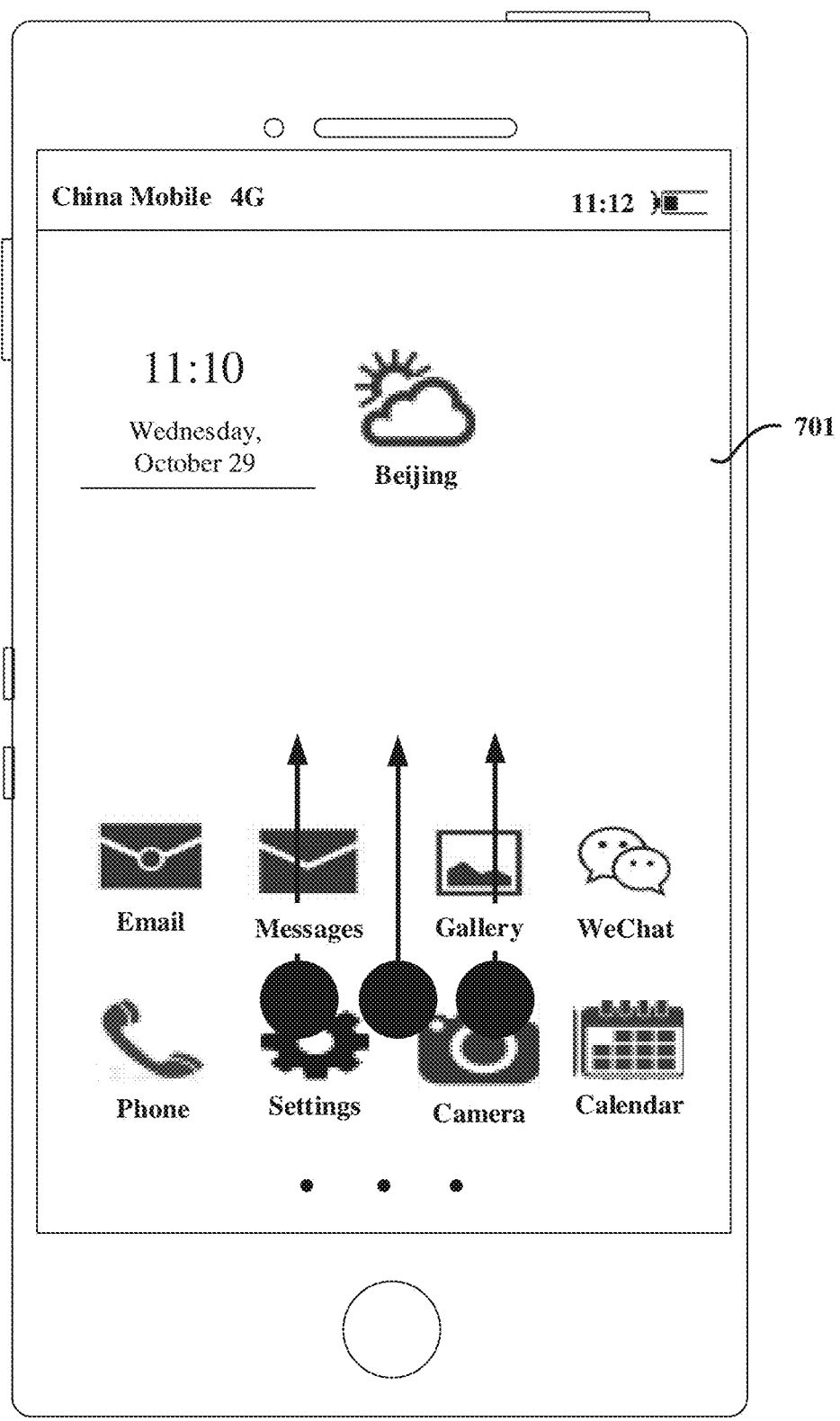
FIG. 12 is a schematic diagram of a user graphic interface according to an embodiment of this disclosure.
Figure 13C:
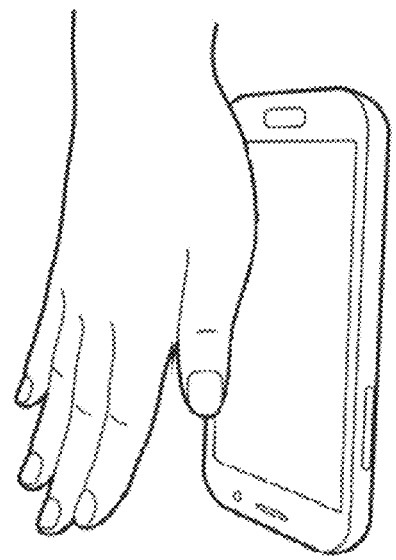
FIG. 13($a$) to FIG. 13($c$) are a schematic diagram of a screen projection operation according to an embodiment of this disclosure.
Figure 13B:
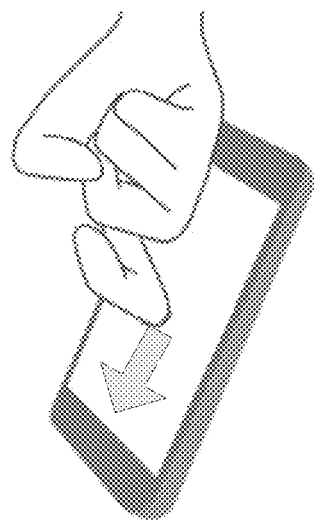
Figure 13A:
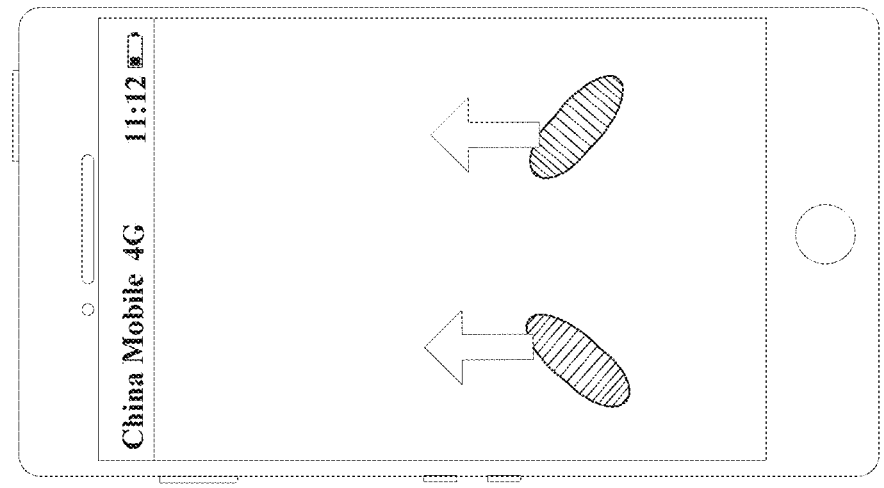

For example, there may be a plurality of screen projection operations, for example, an operation that three fingers slide upward simultaneously and that is shown in FIG. 12, or an operation that two fingers slide upward simultaneously and that is shown in FIG. 13(*a*), or an operation that a knuckle slides upward and that is shown in FIG. 13(*b*), or an operation that a palm is suspended over the display (not in contact with the display) and slides upward and that is shown in FIG. 13(*c*).

1604. Send first information to the target device in response to the screen projection operation, so that the target device displays or plays the first information.

For example, the electronic device may obtain a capability of the target device, and then send, to the target device based on the capability, first information that matches the capability of the target device. For example, if the target device has no screen display function but has an audio playback function, the first electronic device may send currently played audio information to the target device. For another example, if the target device has a screen display function but has no audio playback function, the first electronic device may send currently displayed display information to the target device. For another example, if the target device has a screen display function and an audio playback function, the first electronic device may send currently played audio information and currently displayed display information to the target device. The first electronic device sends, to the target device, the first information that matches the capability of the target device, to prevent the target device from being incapable of displaying or playing information sent to the target device. This helps improve information sending accuracy.

Figure 17:
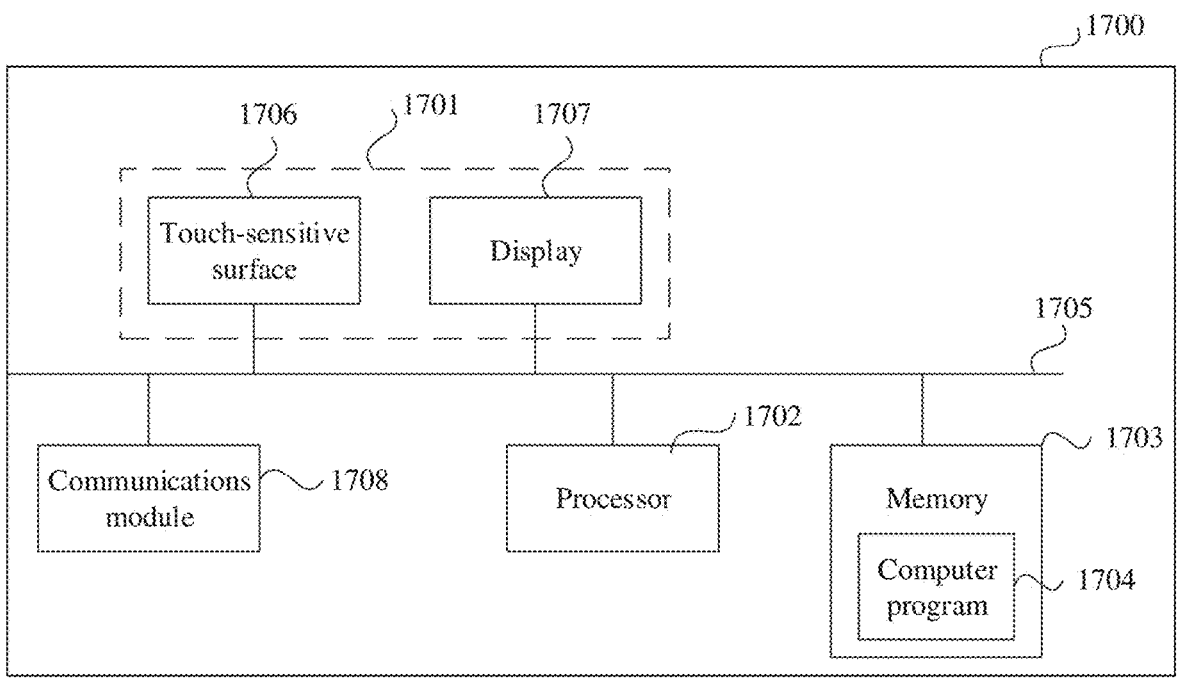
FIG. 17 is a schematic diagram of a structure of an electronic device according to an embodiment of this disclosure.

As shown in FIG. 17, some other embodiments of this disclosure disclose an electronic device 1700. The electronic device is, for example, a mobile phone or an iPad. The electronic device 1700 may include a touchscreen 1701, where the touchscreen 1701 includes a touch-sensitive surface 1706 and a display 1707, one or more processors 1702, and a communications module 1708. The components may be connected by using one or more communications buses 1705.

The touchscreen 1701 may be used as an input device of the electronic device to receive an input operation, for example, to detect a screen projection operation. The display 1707 may be used to display a home screen, a display interface of an application program, or the like. The one or more computer programs 1704 are stored in the memory 1703 and are configured to be executed by the one or more processors 1702. The one or more computer programs 1704 include instructions, and the instructions may be used to perform the steps in the corresponding embodiment in FIG. 5 to FIG. 16.

For example, if the electronic device 1700 is the mobile phone 100 shown in FIG. 3, the touchscreen 1701 is the display 194 of the mobile phone 100, the communications module 1708 may be the mobile communications module 151 and/or the wireless communications module 152, the processor 1702 may be the processor 110 of the mobile phone 100, and the memory 1703 may be the internal memory 121 of the mobile phone 100.

In the embodiments provided in this disclosure, the method provided in the embodiments of this disclosure is described from a perspective in which the terminal device (the mobile phone 100) is used as an execution body. To implement functions in the method provided in the embodiments of this disclosure, the terminal device may include a hardware structure and/or a software module, and implement the functions in a form of the hardware structure, the software module, or a combination of the hardware structure and the software module. Whether a specific function of the foregoing functions is implemented in a manner of a hardware structure, a software module, or a combination of a hardware structure and a software module depends on particular applications and design constraints of the technical solutions.

According to the context, the term "when" or "after" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)". In addition, in the foregoing embodiments, relational terms such as first and second are used to distinguish one entity from another, and any actual relationship and order between these entities are not limited.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of the present invention are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a web station, computer, server, or data center to another web station, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

It should be noted that a part of this patent disclosure document includes content protected by a copyright. The copyright owner reserves the copyright except for making a copy of the patent documents of the China National Intellectual Property Administration or the content of the recorded patent documents.

What is claimed is:

1. An electronic device, comprising at least one processor and a memory, wherein the memory is configured to store one or more computer programs, wherein when the one or more computer programs stored in the memory are executed by the at least one processor, the electronic device is configured to:
   detect a position of one or more other electronic devices relative to the electronic device by using a Bluetooth angle of arrival (AOA) technology;
   determine a target device from the one or more other electronic devices based on the position of the one or more other electronic devices relative to the electronic device;
   detect a screen projection operation; and
   send, in response to the screen projection operation, first information to the target device, so that the target device displays or plays the first information;
   obtain a capability of the target device; and determine, based on the capability of the target device, first information that matches the capability
   wherein when obtaining the capability of the target device, the electronic device is specifically configured to:
   send query information to the target device, wherein the query information is used to query whether the target device has the screen display function and/or whether the target device has the audio playback function; and
   receive feedback information sent by the target device, and determine the capability of the target device based on the feedback information; and
   wherein that the query information is used to query whether the target device has the screen display function comprises: the query information is used to query whether the target device has a display and whether the display is lit up; and
   that the query information is used to query whether the target device has the audio playback function comprises:
   the query information is used to query whether the target device bas an audio playback module and whether the audio playback module is enabled.

2. The electronic device according to claim 1, wherein the electronic device is specifically configured to:
   if the target device has no screen display function but has an audio playback function, determine that audio information currently played by the electronic device is the first information; or
   if the target device has a screen display function but has no audio playback function, determine that display information currently displayed by the electronic device is the first information; or
   if the target device has a screen display function and an audio playback function, determine that audio information currently played by the electronic device and display information currently displayed by the electronic device is the first information.

3. The electronic device according to claim 1, wherein the screen projection operation comprises:
   an operation that three fingers slide simultaneously on a display; or
   an operation that at least two fingers touch and hold a display simultaneously and slide upward without an interval after the touching and holding; or
   an operation that at least one knuckle double taps a display simultaneously; or
   an operation that at least one knuckle touches and holds a display simultaneously and slides upward without an interval after the touching and holding; or
   an operation that a palm is in contact with a display and slides upward on the display; or
   an operation that a palm slides above a display when the palm is suspended over the display and is not in contact with the display.

4. The electronic device according to claim 1, wherein the electronic device further comprises a display;
   the display is configured to display a first interface after the at least one processor detects the position of the one or more other electronic devices relative to the electronic device by using the Bluetooth angle of arrival (AOA) technology, wherein
   the first interface comprises a first device identifier of the electronic device and another device identifier of each of the one or more other electronic devices, the other device identifiers are distributed around the first device identifier based on the position relative to the electronic device, the first device identifier comprises a first direction arrow, and a pointing direction of the first direction arrow changes with movement of the electronic device; and
   the display is further configured to: after the at least one processor determines the target device from the one or more other electronic devices based on the position of the one or more other electronic devices relative to the electronic device, display the first direction arrow in the first interface, so that the first direction arrow points to a device identifier of the target device.

5. The electronic device according to claim 1, wherein before sending, in response to the screen projection operation, the first information to the target device, the electronic device is further configured to output prompt information by using the display of the electronic device, wherein the prompt information is used to prompt a user whether to connect to the target device, and the electronic device is further configured to: after the electronic device receives an instruction of determining to connect to the target device, establish a connection to the target device; or
  when sending, in response to the screen projection operation, the first information to the target device, the electronic device is specifically configured to:
    in response to the screen projection operation, establish a connection to the target device, and send the first information to the target device.

6. The electronic device according to claim 1, wherein when determining the target device from the one or more other electronic devices based on the position of the one or more other electronic devices relative to the electronic device, the electronic device is specifically configured to:
  determine a target device that is in the one or more other electronic devices and that is in a preset position range; or
  determine a target device that is in the one or more other electronic devices and that is directly in front of the electronic device.

7. An electronic device, comprising at least one processor and a memory, wherein the memory is configured to store one or more computer programs, wherein when the one or more computer programs stored in the memory are executed by the at least one processor, the electronic device is configured to:
  detect a position of one or more other electronic devices relative to the electronic device by using a Bluetooth angle of arrival (AOA) technology:
  determine a target device from the one or more other electronic devices based on the position of the one or more other electronic devices relative to the electronic device:
  detect a screen projection operation; and
  send, in response to the screen projection operation, first information to the target device so that the target device displays or plays the first information;
  obtain a capability of the target device; and determine, based on the capability of the target device, first information that matches the capability
  wherein the electronic device further comprises a display;
  the display is configured to display a first interface after the at least one processor detects the position of the one or more other electronic devices relative to the electronic device by using the Bluetooth angle of arrival (AOA) technology, wherein
  the first interface comprises a first device identifier of the electronic device and another device identifier of each of the one or more other electronic devices, the other device identifiers are distributed around the first device identifier based on the position relative to the electronic device, the first device identifier comprises a first direction arrow, and a pointing direction of the first direction arrow changes with movement of the electronic device; and
  the display is further configured to: after the at least one processor determines the target device from the one or more other electronic devices based on the position of the one or more other electronic devices relative to the electronic device, display the first direction arrow in the first interface, so that the first direction arrow points to a device identifier of the target device; and
  wherein the display is further configured to display a second interface before the at least one processor detects the position of the one or more other electronic devices relative to the electronic device by using the Bluetooth angle of arrival (AOA) technology; and
  the display is further configured to display a first window in the second interface after the electronic device is configured to detect the position of the one or more other electronic devices relative to the electronic device by using the Bluetooth angle of arrival (AOA) technology, wherein the first window comprises a third interface, and the third interface is an interface obtained by scaling down the first interface.

8. The electronic device according to claim 7, wherein when obtaining the capability of the target device, the electronic device is specifically configured to determine the capability of the target device based on a device type of the target device.

9. The electronic device according to claim 7, wherein when obtaining the capability of the target device, the electronic device is specifically configured to:
  send query information to the target device, wherein the query information is used to query whether the target device has the screen display function and/or whether the target device has the audio playback function; and
  receive feedback information sent by the target device, and determine the capability of the target device based on the feedback information;
  wherein that the query information is used to query whether the target device has the screen display function comprises: the query information is used to query whether the target device has a display and whether the display is lit up; and
  that the query information is used to query whether the target device has the audio playback function comprises:
  the query information is used to query whether the target device has an audio playback module and whether the audio playback module is enabled.

10. A screen projection method, applied to a first electronic device, wherein the first electronic device enables a Bluetooth function, and the method comprises:
  detecting a position of one or more other electronic devices relative to the first electronic device by using a Bluetooth angle of arrival (AOA) technology;
  determining a target device from the one or more other electronic devices based on the position of the one or more other electronic devices relative to the first electronic device;
  detecting a screen projection operation; and
  sending first information to the target device in response to the screen projection operation, so that the target device displays or plays the first information;
  wherein before the sending first information to the target device in response to the screen projection operation, the method further comprises:
  obtaining a capability of the target device; and
  sending, to the target device based on the capability of the target device, first information that matches the capability;
  wherein the obtaining a capability of the target device comprises:
  sending query information to the target device, wherein the query information is used to query whether the target device has the screen display function and/or whether the target device has the audio playback function; and
  receiving feedback information sent by the target device, and determining the capability of the target device based on the feedback information;
  wherein that the query information is used to query whether the target device has the screen display function comprises: the query information is used to query whether the target device has a display and whether the display is lit up; and that the query information is used to query whether the target device has the audio playback function comprises:

the query information is used to query whether the target device has an audio playback module and whether the audio playback module is enabled.

11. The method according to claim 10, wherein the sending, to the target device based on the capability of the target device, first information that matches the capability comprises:

if the target device has no screen display function but has an audio playback function, sending first information of the first electronic device to the target device, wherein the first information is audio information currently played by the first electronic device; or if the target device has a screen display function but has no audio playback function, sending first information of the first electronic device to the target device, wherein the first information is display information currently displayed by the first electronic device; or if the target device has a screen display function and an audio playback function, sending first information of the first electronic device to the target device, wherein the first information comprises audio information currently played by the first electronic device and display information currently displayed by the first electronic device.

12. The method according to claim 10, wherein the screen projection operation further comprises:

an operation that three fingers slide simultaneously on a display; or an operation that at least two fingers touch and hold a display simultaneously and slide upward without an interval after the touching and holding; or an operation that at least one knuckle double taps a display simultaneously; or an operation that at least one knuckle touches and holds a display simultaneously and slides upward without an interval after the touching and holding; or an operation that a palm is in contact with a display and slides upward on the display; or an operation that a palm slides above a display when the palm is suspended over the display and is not in contact with the display.

13. The method according to claim 10, wherein after the detecting a position of the one or more other electronic devices relative to the first electronic device by using a Bluetooth angle of arrival (AOA) technology, the method further comprises:

displaying a first interface, wherein the first interface comprises a first device identifier of the first electronic device and another device identifier of each of the one or more other electronic devices, the other device identifiers are distributed around the first device identifier based on the position relative to the first electronic device, the first device identifier comprises a first direction arrow, and a pointing direction of the first direction arrow changes with movement of the first electronic device; and after the determining a target device from the one or more other electronic devices based on the position of the one or more other electronic devices relative to the first electronic device, the method further comprises:

displaying the first direction arrow in the first interface, so that the first direction arrow points to a device identifier of the target device.

14. The method according to claim 10, wherein before the sending first information to the target device in response to the screen projection operation, the method further comprises:

outputting prompt information, wherein the prompt information is used to prompt a user whether to connect to the target device; and after receiving an instruction of determining to connect to the target device, establishing a connection to the target device; or the sending first information to the target device in response to the screen projection operation comprises:

in response to the screen projection operation, establishing a connection to the target device, and sending the first information to the target device.

15. The method according to claim 10, wherein the determining a target device from the one or more other electronic devices based on the position of the one or more other electronic devices relative to the first electronic device comprises determining a target device that is in the one or more other electronic devices and that is in a preset position range.

16. A screen projection method, applied to a first electronic device, wherein the first electronic device enables a Bluetooth function, and the method comprises:

detecting a position of one or more other electronic devices relative to the first electronic device by using a Bluetooth angle of arrival (AOA) technology;

determining a target device from the one or more other electronic devices based on the position of the one or more other electronic devices relative to the first electronic device;

detecting a screen projection operation; and sending first information to the target device in response to the screen projection operation, so that the target device displays or plays the first information;

wherein before the sending first information to the target device in response to the screen projection operation, the method further comprises:

obtaining a capability of the target device; and sending, to the target device based on the capability of the target device, first information that matches the capability:

wherein after the detecting a position of the one or more other electronic devices relative to the first electronic device by using a Bluetooth angle of arrival (AOA) technology, the method further comprises:

displaying a first interface, wherein the first interface comprises a first device identifier of the first electronic device and another device identifier of each of the one or more other electronic devices, the other device identifiers are distributed around the first device identifier based on the position relative to the first electronic device, the first device identifier comprises a first direction arrow, and a pointing direction of the first direction arrow changes with movement of the first electronic device; and after the determining a target device from the one or more other electronic devices based on the position of the one or more other electronic devices relative to the first electronic device, the method further comprises:

displaying the first direction arrow in the first interface, so that the first direction arrow points to a device identifier of the target device;

wherein before the detecting a position of the one or more other electronic devices relative to the first electronic device by using a Bluetooth angle of arrival (AOA) technology, the method further comprises:

displaying a second interface; and after the detecting a position of the one or more other electronic devices relative to the first electronic device by using a Bluetooth angle of arrival (AOA) technology, the method further comprises:

displaying a first window in the second interface, wherein the first window comprises a third interface, and the third interface is an interface obtained by scaling down the first interface.

17. The method according to claim 16, wherein the obtaining a capability of the target device comprises determining the capability of the target device based on a device type of the target device.

18. The method according to claim 16, wherein the obtaining a capability of the target device comprises:

sending query information to the target device, wherein the query information is used to query whether the target device has the screen display function and/or whether the target device has the audio playback function; and receiving feedback information sent by the target device, and determining the capability of the target device based on the feedback information; and wherein that the query information is used to query whether the target device has the screen display function comprises: the query information is used to query whether the target device has a display and whether the display is lit up; and that the query information is used to query whether the target device has the audio playback function comprises:

the query information is used to query whether the target device has an audio playback module and whether the audio playback module is enabled.

* * * * *